(12) United States Patent
Desrosiers et al.

(10) Patent No.: US 8,492,044 B2
(45) Date of Patent: Jul. 23, 2013

(54) SYSTEMS AND METHODS FOR STARTING AND OPERATING FUEL CELL SYSTEMS IN SUBFREEZING TEMPERATURES

(75) Inventors: Kevin C. Desrosiers, Bend, OR (US); Arne LaVen, Bend, OR (US); David W. Skinkle, Bend, OR (US)

(73) Assignee: Idatech, LLC, Bend, OR (US)

( * ) Notice: Subject to any disclaimer, the term of this patent is extended or adjusted under 35 U.S.C. 154(b) by 0 days.

(21) Appl. No.: 13/267,675

(22) Filed: Oct. 6, 2011

(65) Prior Publication Data

US 2012/0028155 A1 Feb. 2, 2012

Related U.S. Application Data

(62) Division of application No. 11/755,608, filed on May 30, 2007, now Pat. No. 8,034,500.

(51) Int. Cl.
*H01M 8/04* (2006.01)
(52) U.S. Cl.
USPC ............................ 429/434; 429/433; 429/442
(58) Field of Classification Search
USPC .......................................... 429/434, 433, 442
See application file for complete search history.

(56) References Cited

U.S. PATENT DOCUMENTS

| | | |
|---|---|---|
| 2,824,620 A | 2/1958 | De Rosset |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,522,019 A | 7/1970 | Buswell et al. |
| 3,655,448 A | 4/1972 | Setzer |
| 3,857,735 A | 12/1974 | Louis et al. |
| 4,098,959 A | 7/1978 | Fanciullo |
| 4,098,960 A | 7/1978 | Gagnon |
| 4,175,165 A | 11/1979 | Adlhart |
| 4,214,969 A | 7/1980 | Lawrance |
| 4,390,602 A | 6/1983 | Struthers |
| 4,468,235 A | 8/1984 | Hill |
| 4,642,273 A | 2/1987 | Sasaki |
| 4,855,192 A | 8/1989 | Grasso |

(Continued)

FOREIGN PATENT DOCUMENTS

| | | |
|---|---|---|
| WO | WO 03/049221 A2 | 6/2003 |
| WO | WO 2004/004034 A2 | 1/2004 |

OTHER PUBLICATIONS

International Search Report and Written Opinion for PCT/US08/06398, 2008.

*Primary Examiner* — Helen O Conley
(74) *Attorney, Agent, or Firm* — Dascenzo Intellectual Property Law, P.C.

(57) ABSTRACT

Systems and methods for initiating use of, or starting up, fuel cell stacks in subfreezing temperatures. The fuel cell stacks include a thermal management system that is adapted to deliver a liquid heat exchange fluid into thermal communication with a fuel cell stack, such as to heat the stack during startup of the stack when the stack is at a subfreezing temperature or operated in a subfreezing environment. In some embodiments, the thermal management system includes a heat exchange circuit that is configured to provide delivery of the liquid heat exchange fluid to the fuel cell stack even when the conduits are at a subfreezing temperature. In some embodiments, the fuel cell system is configured to deliver liquid heat exchange fluid from the fuel cell stack and heat exchange circuit when the thermal management system is not being utilized.

22 Claims, 8 Drawing Sheets

U.S. PATENT DOCUMENTS

| | | | |
|---|---|---|---|
| 5,229,222 A | 7/1993 | Tsutsumi et al. |
| 5,366,818 A | 11/1994 | Wilkinson et al. |
| 5,366,821 A | 11/1994 | Merritt et al. |
| 5,401,589 A | 3/1995 | Palmer et al. |
| 5,432,710 A | 7/1995 | Ishimaru et al. |
| 5,527,632 A | 6/1996 | Gardner |
| 5,637,414 A | 6/1997 | Inoue et al. |
| 5,658,681 A | 8/1997 | Sato et al. |
| 5,677,073 A | 10/1997 | Kawatsu |
| 5,795,666 A | 8/1998 | Johnssen |
| 5,798,186 A | 8/1998 | Fletcher et al. |
| 5,861,137 A | 1/1999 | Edlund |
| 5,897,970 A | 4/1999 | Isomura et al. |
| 5,985,474 A | 11/1999 | Chen et al. |
| 5,997,594 A | 12/1999 | Edlund et al. |
| 6,007,931 A | 12/1999 | Fuller et al. |
| 6,028,414 A | 2/2000 | Chouinard et al. |
| 6,083,637 A | 7/2000 | Walz et al. |
| 6,146,780 A | 11/2000 | Cisar et al. |
| 6,165,633 A | 12/2000 | Negishi |
| 6,186,254 B1 | 2/2001 | Mufford et al. |
| 6,221,117 B1 | 4/2001 | Edlund et al. |
| 6,268,077 B1 | 7/2001 | Kelley et al. |
| 6,280,864 B1 | 8/2001 | Towler et al. |
| 6,319,306 B1 | 11/2001 | Edlund et al. |
| 6,376,113 B1 | 4/2002 | Edlund et al. |
| 6,383,670 B1 | 5/2002 | Edlund et al. |
| 6,394,207 B1 | 5/2002 | Skala |
| 6,425,440 B1 | 7/2002 | Tsenter et al. |
| 6,465,118 B1 | 10/2002 | Dickman et al. |
| 6,479,177 B1 | 11/2002 | Roberts et al. |
| 6,489,048 B1 | 12/2002 | Ernst et al. |
| 6,494,937 B1 | 12/2002 | Edlund et al. |
| 6,495,277 B1 | 12/2002 | Edlund et al. |
| 6,562,111 B2 | 5/2003 | Edlund et al. |
| 6,610,431 B1 | 8/2003 | Walsh et al. |
| 6,663,993 B2 | 12/2003 | Imaseki et al. |
| 6,673,482 B2 | 1/2004 | Imazeki et al. |
| 6,821,658 B2 | 11/2004 | Acker et al. |
| 6,835,481 B2 | 12/2004 | Dickman et al. |
| 7,026,065 B2 | 4/2006 | Ballantine et al. |
| 2003/0064262 A1 | 4/2003 | Ballantine et al. |
| 2003/0087139 A1 | 5/2003 | White |
| 2003/0113601 A1 | 6/2003 | Edlund et al. |
| 2004/0101734 A1 | 5/2004 | Morishima et al. |
| 2005/0084726 A1 | 4/2005 | Dickman et al. |
| 2006/0110641 A1* | 5/2006 | Wilson et al. ............ 429/26 |
| 2006/0177714 A1 | 8/2006 | Ballantine et al. |
| 2007/0003804 A1* | 1/2007 | Ogawa ..................... 429/22 |
| 2007/0042247 A1 | 2/2007 | Baird et al. |
| 2011/0143245 A1* | 6/2011 | Kawasaki et al. ......... 429/429 |

* cited by examiner

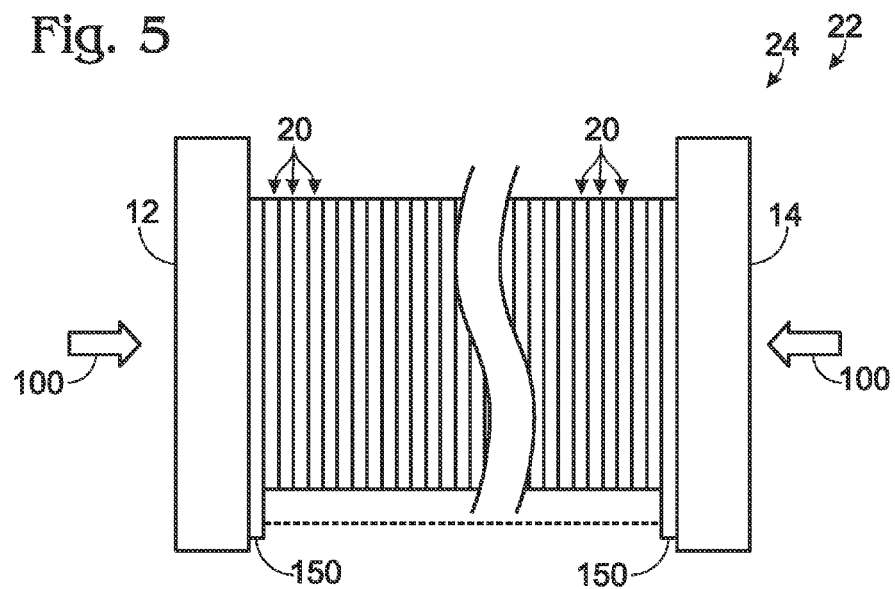
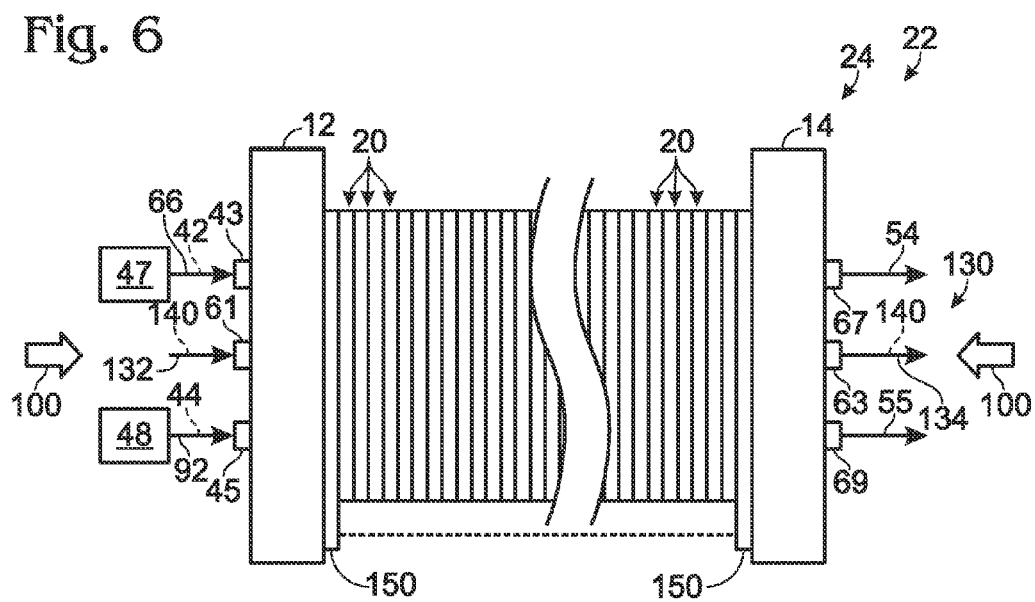

SYSTEMS AND METHODS FOR STARTING AND OPERATING FUEL CELL SYSTEMS IN SUBFREEZING TEMPERATURES

RELATED APPLICATION

This application is a divisional of and claims priority to U.S. patent application Ser. No. 11/755,608, which was filed May 30, 2007, and which issued as U.S. Pat. No. 8,034,500 on Oct. 11, 2011, the complete disclosure of which is incorporated herein by reference in its entirety.

FIELD OF THE DISCLOSURE

The present disclosure is directed generally to fuel cell systems, and more particularly to systems and methods for initiating use of, and operating, fuel cell systems in subfreezing temperatures.

BACKGROUND OF THE DISCLOSURE

Fuel cell stacks are electrochemical devices that produce water and an electric potential from a fuel, which typically is a proton-liberating source, and an oxidant. Many conventional fuel cell stacks utilize hydrogen gas as the proton source and oxygen, air, or oxygen-enriched air as the oxidant. Fuel cell stacks typically include many fuels cells that are fluidly and electrically coupled together, often between common end plates. The fuel cell stack receives flows of hydrogen gas and air from suitable sources and distributes these flows to the individual fuel cells in the stack. The fuel cell stack includes manifolds and other delivery conduits to deliver and remove fluids to and from the fuel cells within the fuel cell stack. Conventionally, a fuel cell stack includes current collectors that are adapted to be electrically connected to an external load so that the electrical output produced by the fuel cell stack may be used to satisfy the applied external load.

The fuel cells in the fuel cell stack include anode and cathode regions that are separated by an electrolytic barrier, which may take the form of an electrolytic membrane. Hydrogen gas is delivered to the anode region, and oxygen gas is delivered to the cathode region. Protons from the hydrogen gas are drawn through the electrolytic membrane to the anode region, where water is formed. Conventionally, the anode and cathode regions are periodically or continuously purged to remove water and accumulated gases in these regions. While protons may pass through the membranes, electrons cannot. Instead, the electrons that are liberated by the passing of the protons through the membranes travel through an external circuit to form an electric current.

A factor that affects the performance, or efficiency, of a fuel cell stack to produce an electric current is the temperature of the stack. Accordingly, it is desirable to maintain the fuel cell stack within a range of suitable operating temperatures, such as within upper and lower threshold temperatures. During startup, the stack may not be at a temperature within this desired temperature range, and in such a situation, it is desirable to transition the stack to a temperature within this range. Maintaining and/or starting up a fuel cell stack in subfreezing temperatures is more difficult because the liquid heat exchange fluid may be frozen or freeze when drawn from a reservoir for delivery to the fuel cell stack.

SUMMARY OF THE DISCLOSURE

The present disclosure is directed to systems and methods for initiating use of, or starting up, fuel cell stacks in subfreezing temperatures. The fuel cell stacks include a thermal management system that is adapted to deliver a liquid heat exchange fluid into thermal communication with a fuel cell stack, such as to heat the stack during startup of the stack when the stack is at a subfreezing temperature. The thermal management system may additionally utilize this and/or another heat exchange fluid to cool the stack when the stack is being operated at higher temperatures. In some embodiments, the liquid heat exchange fluid is a water-based fluid, is water, or is deionized water. In some embodiments, the thermal management system includes a liquid reservoir that is sized to hold a volume of the liquid heat exchange fluid. In some embodiments, the liquid reservoir is sized to hold all of the liquid heat exchange fluid that is utilized by the thermal management system, such as during periods in which the fuel cell stack and/or thermal management system is not in use. In some embodiments, the thermal management system includes a heat exchange circuit that is configured to provide delivery of the liquid heat exchange fluid to the fuel cell stack even when fluid conduits within the heat exchange circuit are at a subfreezing temperature. In some embodiments, the heat exchange conduits include a primary heat exchange conduit assembly that is nominally utilized to deliver liquid heat exchange fluid to the fuel cell stack, and an secondary heat exchange conduit assembly that is adapted to automatically receive the liquid heat exchange fluid and to deliver the liquid heat exchange fluid to the fuel cell stack should the primary heat exchange conduit assembly become obstructed, such as with frozen liquid heat exchange fluid. In some embodiments, the primary and secondary heat exchange conduit assemblies may form portions of a heat exchange circuit and/or may utilize the same manifolds to deliver the liquid heat exchange fluid into thermal communication with the fuel cells in the fuel cell stack. In some embodiments, the fuel cell system is configured to automatically deliver the liquid heat exchange fluid from the fuel cell stack and associated heat exchange conduits to the liquid reservoir when the thermal management system is not being utilized.

BRIEF DESCRIPTION OF THE DRAWINGS

FIG. 5 is a schematic side elevation view of a fuel cell stack that may be used with thermal management systems according to the present disclosure.

FIG. 6 is a schematic side elevation view of another fuel cell stack that may be used with thermal management systems according to the present disclosure.

DETAILED DESCRIPTION AND BEST MODE OF THE DISCLOSURE

Figure 1:
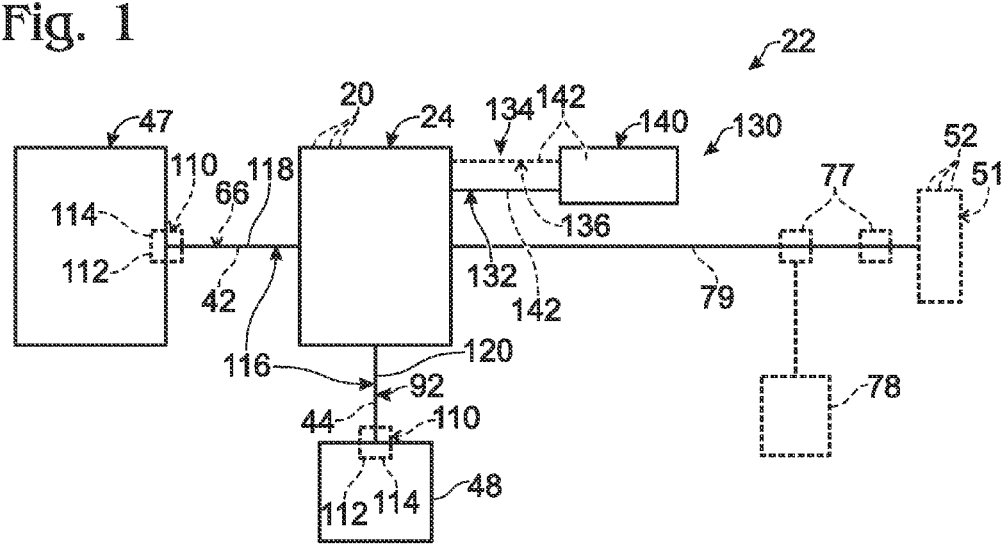
FIG. 1 is a schematic view of an illustrative fuel cell system that includes a thermal management system according to the present disclosure.

An example of a fuel cell system is schematically illustrated in FIG. 1 and generally indicated at 22. As discussed in more detail herein, fuel cell system 22 includes at least one fuel cell stack 24 and a thermal management system 130 that is adapted to selectively deliver at least one liquid heat exchange stream 132 of a liquid heat exchange fluid 142 into thermal communication with the fuel cell stack to selectively heat or cool the fuel cell stack. The thermal management system includes at least one liquid reservoir 140 that is sized to store a volume of the liquid heat exchange fluid. As indicated in dashed lines in FIG. 1, and as discussed in more detail herein, thermal management system 130 may include at least one heat exchange circuit 134, such as by including at least one recycle stream 136 in which heat exchange fluid is withdrawn from thermal communication with the fuel cell stack and selectively returned to liquid reservoir 140 and/or reused in liquid heat exchange stream 132. Fuel cell stack 24 may be referred to as a liquid-cooled fuel cell stack, as it is within the scope of the present disclosure that thermal management system 130 is adapted to selectively deliver, withdraw, and further selectively redeliver liquid heat exchange fluid streams to and from the fuel cell stack to achieve and maintain a desired operating temperature, or temperature range, within the fuel cell stack.

As discussed in more detail herein, during startup of the fuel cell stack in at least subfreezing temperatures, the fuel cell stack may be referred to as a liquid-heated fuel cell stack. Startup of the fuel cell system refers to when the fuel cell system is transitioned from an off (or dormant) state, in which the fuel cell stack is not producing an electrical output and in which fuel and oxidant are not being delivered to the fuel cell stack to produce an electrical output therefrom, and a running (or power-producing) operating state, in which the fuel cell stack is within the range of selected operating temperatures, is receiving fuel and oxidant, and is producing an electrical output therefrom to satisfy at least a portion of an applied load. In some embodiments, startup of the fuel cell system may (but is not required to in all embodiments) include heating of at least a portion of the fuel cell system. In some embodiments, startup of the fuel cell system may (but is not required to in all embodiments) include generating fuel, such as hydrogen gas) for the fuel cell stack by chemical reaction of at least one feedstock.

Fuel cell stack 24 is adapted to produce an electrical output from fuel 42 and oxidant 44 that are delivered to the stack. Fuel 42 may be any suitable reactant, or feedstock, for producing the electrical output in a fuel cell stack when the fuel and an oxidant are delivered to the anode and cathode regions, respectively, of the fuel cells in the fuel cell stack while a load is being applied to the fuel cell stack. The fuel cell stack may thus be described as producing an electrical output, or power output, 79, which may be used to satisfy all or a least a portion of this applied load. Fuel 42 may, but is not required to be, a proton-liberating source. In the following discussion, fuel 42 will be described as being hydrogen gas, and oxidant 44 will be described as being air, but it is within the scope of the present disclosure that other suitable fuels and/or oxidants may be used to produce the electrical output of the fuel cell stack. As illustrative, non-exclusive examples, other suitable oxidants include oxygen-enriched air streams, and streams of pure or substantially pure oxygen gas. Illustrative, non-exclusive examples of other suitable fuels include methanol, methane, and carbon monoxide. Fuel cell system 22 may also be referred to as an energy-producing system.

As schematically illustrated in FIG. 1, fuel cell system 22 includes and/or is in fluid communication with a source, or supply, 47 of hydrogen gas (or other fuel) and an air (or other oxidant) source, or supply, 48. Hydrogen gas 42 and oxygen gas 44 may be delivered to the fuel cell stack via any suitable mechanism from sources 47 and 48. Fuel cell stack 24 produces electrical output 79 from these streams. Illustrative, non-exclusive examples of suitable sources 47 for hydrogen gas 42 include a pressurized tank, a metal hydride bed or other suitable hydrogen storage device that contains a supply of hydrogen gas, a chemical hydride (such as a solution of sodium borohydride), and/or a fuel processor or other hydrogen generation assembly that produces a stream containing pure or at least substantially pure hydrogen gas from at least one feedstock. Illustrative, non-exclusive examples of suitable sources 48 of oxygen gas 44 include a pressurized tank of oxygen gas, oxygen-enriched air, or air; an oxygen-enrichment assembly that is adapted to produce an oxygen-enriched air stream; and the environmental air that is present proximate the fuel cell stack.

The fuel cell system may include at least one reactant delivery system 110 that is adapted to deliver hydrogen (gas) stream 66 and/or air stream 92 to the fuel cell stack 24. The hydrogen gas (or other fuel) and air (or other oxidant) may be delivered by the same or separate reactant delivery systems. As such, in some embodiments, the fuel cell system may be described as including a reactant delivery system 110 that is adapted to deliver streams of fuel and oxidant from the respective fuel and oxidant supplies, or sources. In some embodiments, the reactant delivery system and/or the fuel cell system may be described as including a fuel delivery system and/or an oxidant delivery system. When the fuel is hydrogen gas and the oxidant is air, the fuel delivery system may be referred to as a hydrogen delivery system and the oxidant delivery system may be referred to as an air delivery system. When the hydrogen or oxygen source contains a pressurized supply of hydrogen gas or oxygen gas, then the reactant delivery system may include any suitable flow-regulating and/or pressure-regulating structure 112 to selectively permit the flow of the pressurized gas to the fuel cell stack at, or within a suitable range, of pressure for use in the fuel cell stack to produce electrical output 79. In some embodiments, the reactant delivery system may include a propulsion mechanism 114, such as a pump, fan, blower, compressor, or other suitable device that is adapted to propel the hydrogen gas or oxygen gas from the source to the fuel cells in the fuel cell stack.

The reactant delivery system and/or fuel cell system 22 may be described as including, and/or being in fluid communication with, a suitable reactant conduit structure, or reactant flow passages, 116. Reactant conduit structure 116 provides at least one fluid conduit 118 through which fuel (such as hydrogen gas) may be delivered from the fuel source to the anode regions of the fuel cell stack, and at least one conduit 120 through which air or other suitable oxidant may be delivered from the oxidant source to the cathode regions of the fuel cell stack.

FIG. 1 schematically depicts that fuel cell system 22 may, but is not required to, include at least one energy-storage device 78. Device 78, when included, may be adapted to store at least a portion of the electrical output, or power, 79 from the fuel cell stack 24. An illustrative example of a suitable energy-storage device 78 is a battery, but others may be used. Illustrative, non-exclusive examples of other suitable energy-storage devices that may be used in place of or in combination with one or more batteries include capacitors, flywheels, and ultracapacitors or supercapacitors. Energy-storage device 78 may additionally or alternatively be used to power the fuel cell system 22 during startup of the fuel cell system. As indicated in dashed lines at 77 in FIG. 1, the fuel cell system may, but is not required to, include at least one power management module 77. Power management module 77 includes any suitable structure for conditioning or otherwise regulating the electricity produced by the fuel cell system, such as for delivery to an energy-consuming device. Power management module 77, when present, may include such illustrative structure as buck and/or boost converters, rectifiers, inverters, power filters, relays, switches, combinations thereof, and the like.

Also shown in dashed lines in FIG. 1 is an energy-consuming assembly 51 that includes at least one energy-consuming device 52. Energy-consuming assembly 51 graphically represents one or more device that is adapted to apply a load to the fuel cell system, with the fuel cell system being adapted to satisfy at least a portion, if not all, of this applied load with the electrical output produced by the fuel cell stack. The at least one energy-consuming device 52 of energy-consuming assembly 51 may be electrically coupled to fuel cell system 22, such as to the fuel cell stack 24 and/or one or more optional energy-storage devices 78 associated with the stack. Energy-consuming assembly 51 applies a load to the fuel cell system 22 and draws power, or an electrical output, from the fuel cell system to satisfy the load. This load may be referred to as an applied load, and may include thermal and/or electrical load(s). It is within the scope of the present disclosure that the applied load may be satisfied by the fuel cell stack, the energy-storage device, or both the fuel cell stack and the energy-storage device. Illustrative, non-exclusive examples of energy-consuming devices 52 include motor vehicles, recreational vehicles, boats and other sea craft, and any combination of one or more households, residences, commercial offices or buildings, neighborhoods, tools, lights and lighting assemblies, appliances, computers, industrial equipment, signaling and communications equipment, radios, electrically powered components of boats, recreational vehicles or other vehicles, battery chargers, and even the balance-of-plant electrical requirements for the fuel cell system of which fuel cell stack 24 forms a part.

Fuel cell system 22 may include additional components that are not specifically illustrated in the schematic figures, including additional heat exchangers, sensors, controllers, flow-regulating devices, and the like.

Fuel cell stacks 22 according to the present disclosure may utilize any suitable type of fuel cell that is adapted to operate at temperatures less than the boiling point of water, which are referred to herein as low temperature fuel cells. Illustrative examples of types of fuel cells include proton exchange membrane (PEM) fuel cells, alkaline fuel cells, and the like. For the purpose of illustration, an exemplary fuel cell 20 in the form of a PEM fuel cell is schematically illustrated in FIG. 2.

Proton exchange membrane fuel cells typically utilize a membrane-electrode assembly 26 consisting of an electrolytic barrier in the form of an ion exchange, or electrolytic, membrane 28 that is located between an anode region 30 and a cathode region 32. Each region 30 and 32 includes an electrode 34, namely an anode 36 and a cathode 38, respectively. Each region 30 and 32 also includes a support 39, such as a supporting plate 40. Support 39 may form a portion of a bipolar plate assembly. The supporting plates 40 of fuel cells 20 carry the relative voltage potentials produced by the fuel cells in fuel cell stack 24.

In operation, hydrogen gas 42 from supply 47 is delivered to anode region 30, and air 44 from supply 48 is delivered to cathode region 32. Hydrogen gas 42 and oxygen gas 44 may be delivered to the respective regions of the fuel cell via any suitable mechanism from respective sources 47 and 48, such as discussed herein. Hydrogen and oxygen typically combine with one another via an oxidation-reduction reaction. Although membrane 28 restricts the passage of a hydrogen molecule, it will permit a hydrogen ion (proton) to pass through it, largely due to the ionic conductivity of the membrane. The free energy of the oxidation-reduction reaction drives the proton from the hydrogen gas through the ion exchange membrane. As membrane 28 also tends not to be electrically conductive, an external circuit 50 is the lowest energy path for the remaining electron, and is schematically illustrated in FIG. 2. In cathode region 32, electrons from the external circuit and protons from the membrane combine with oxygen to produce water and heat. Thermal management systems 130 according to the present disclosure may be adapted to selectively regulate this heat to maintain the fuel cell within a predetermined, or selected, operating temperature range, such as below a maximum threshold temperature, and/or above a minimum threshold temperature. For many PEM fuel cells, a suitable operating temperature range is 40-80° C., although this is but an illustrative, non-exclusive example and is not required. Additional illustrative, non-exclusive examples include 50-75° C. and 60-70° C.

Figure 2:
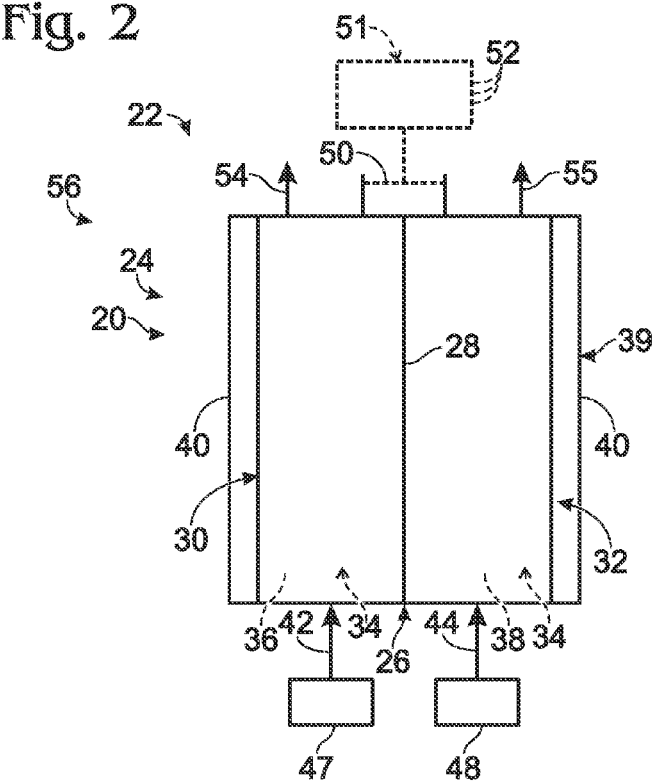
FIG. 2 is a schematic view of an illustrative fuel cell, such as may be included in fuel cell stacks that are used with a thermal management system according to the present disclosure.

Also shown in FIG. 2 are an anode purge, or exhaust, stream 54, which may contain hydrogen gas, and a cathode air exhaust stream 55, which is typically at least partially, if not substantially, depleted of oxygen gas. Fuel cell stack 24 may include a common hydrogen (or other reactant) feed, air intake, and stack purge and exhaust streams, and accordingly will include suitable fluid conduits to deliver the associated streams to, and collect the streams from, the individual fuel cells. Similarly, any suitable mechanism may be used for selectively purging the anode and cathode regions.

In practice, fuel cell stack 24 will include a plurality of fuel cells with bipolar plate assemblies or other suitable, typically conductive, supports separating adjacent membrane-electrode assemblies. The bipolar plate assemblies essentially permit the free electron to pass from the anode region of a first cell to the cathode region of the adjacent cell via the bipolar plate assembly, thereby establishing an electrical potential through the stack that may be used to satisfy an applied load. This net flow of electrons produces an electric current that may be used to satisfy an applied load, such as from at least one of an energy-consuming device 52 and the fuel cell system.

Figure 3:
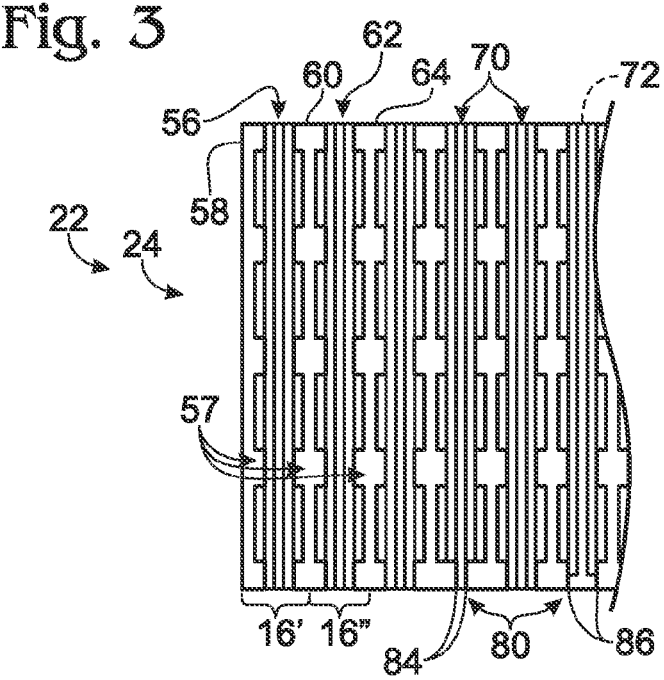
FIG. 3 is a schematic fragmentary view of a plurality of fuel cells, as may be used in fuel cell stacks with a thermal management system according to the present disclosure.

FIG. 3 shows a schematic representation of a fragmentary portion of an illustrative, non-exclusive example of a fuel cell stack 24, such as may be used in a fuel cell system according to the present disclosure. As shown, the illustrated portion includes a plurality of fuel cells, including fuel cells 16' and 16". Fuel cell 16' includes a membrane-electrode assembly (MEA) 56 positioned between a pair of bipolar plate assemblies 57, such as assemblies 58 and 60. Similarly, fuel cell 16" includes an MEA 62 positioned between a pair of bipolar plate assemblies 57, such as bipolar plate assemblies 60 and 64. Therefore, bipolar plate assembly 60 is operatively interposed between adjacently situated MEAs 56 and 62. Additional fuel cells may be serially connected in similar fashion, wherein a bipolar plate may be operatively interposed between adjacent MEAs. The phrase "working cell" is used herein to describe fuel cells, such as cells 16' and 16", which are configured to produce electric current and typically include an MEA positioned between bipolar plate assemblies.

Figure 4:
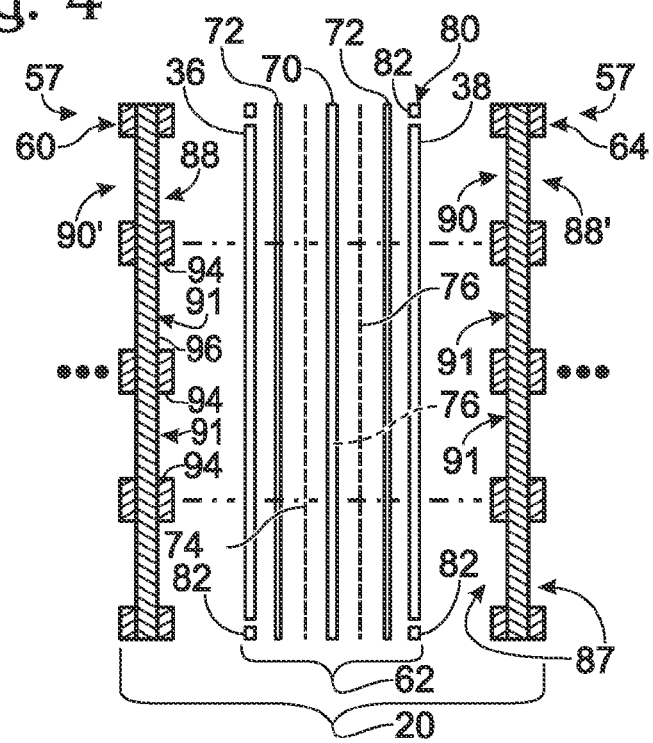
FIG. 4 is an exploded schematic view of a fuel cell, as may be used in fuel cell stacks with a thermal management system according to the present disclosure.

FIG. 4 shows an exploded schematic view of an illustrative fuel cell, or fuel cell assembly, 20, which as discussed includes a membrane-electrode assembly (MEA) 62 positioned between bipolar plate assemblies 60 and 64. MEA 62 includes anode 36, cathode 38, and an electron barrier 70 that is positioned therebetween. Electron barrier 70 may include any suitable structure and/or composition that enables protons to pass therethrough and yet retards the passage of electrons to bias the electrons to an external circuit. As an illustrative example, barrier 70 may include a membrane-supported electrolyte that is capable of blocking electrons, while allowing protons to pass. For example, in PEM fuel cells, electron barrier 70 may be a membrane that is configured to conduct hydrogen cations (protons) and inhibit electron flow, and as such may also be described as an ion exchange membrane. In an alkaline fuel cell, electron barrier 70 may include an aqueous alkaline solution or membrane.

For at least PEM fuel cells, the electrodes, such as anode 36 and cathode 38, may be constructed of a porous, electrically conductive material such as carbon fiber paper, carbon fiber cloth, or other suitable materials. Catalysts 74 and 76 are schematically depicted as being disposed between the electrodes and the electron barrier. Such catalysts facilitate electrochemical activity and may (but are not required to) be embedded into barrier 70, such as into membrane 28. Fuel cell 20 may also include a gas diffusion layer 72 between the electrodes and catalysts 74 and 76. For example, layer 72 may be formed on the surface of the electrodes and/or the catalysts and may be formed from a suitable gas diffusing material, such as a thin film of powdered carbon. Layer 72 may be treated to be hydrophobic to resist the coating of the gas diffusion layers by water present in the anode and cathode regions, which may prevent gas from flowing therethrough. It is typically desirable to have a fluid seal between adjacent bipolar plate assemblies. As such, a variety of sealing materials or sealing mechanisms 80 may be used at or near the perimeters of the bipolar plate assemblies. An illustrative, non-exclusive example of a suitable sealing mechanism 80 is a gasket 82 that extends between the outer perimeters of the bipolar plate assemblies and barrier 70. Other illustrative, non-exclusive examples of suitable sealing mechanisms 80 are schematically illustrated in the lower portion of FIG. 3 and include bipolar plate assemblies with projecting flanges 84, which extend into contact with barrier 70, and/or a barrier 70 with projecting flanges 86 that extend into contact with the bipolar plate assemblies. In some embodiments, such as graphically depicted in FIG. 4, the fuel cells may include a compressible region between adjacent bipolar plate assemblies, with gaskets 82 and compressible membranes being examples of suitable compressible regions that permit the cells, and thus the fuel cell stack, to be more tolerant and able to withstand external forces applied thereto.

As shown in FIG. 4, bipolar plate assemblies 60 and 64 may extend along opposite sides of MEA 62 so as to provide structural support to the MEA. Such an arrangement also allows the bipolar plate assemblies to provide a current path between adjacently situated MEAs. Bipolar plate assemblies 60 and 64 are shown with flow fields 87, namely anode flow fields 88 and cathode flow fields 90. Flow field 88 is configured to transport fuel, such as hydrogen gas, to the anode. Similarly, flow field 90 is configured to transport oxidant, such as oxygen gas, to the cathode and to remove water and heat therefrom. The flow fields also provide conduits through which the exhaust or purge streams may be withdrawn from the fuel cell assemblies. The flow fields typically include one or more channels 91 that are at least partially defined by opposing sidewalls 94 and a bottom, or lower surface, 96. Flow fields 88 and 90 have been schematically illustrated in FIG. 4 and may have a variety of shapes and configurations. Similarly, the channels 91 in a given flow field may be continuous, discontinuous, or may contain a mix of continuous and discontinuous channels. Examples of a variety of flow field configurations are shown in U.S. Pat. Nos. 4,214,969, 5,300,370, and 5,879,826, the complete disclosures of which are herein incorporated by reference.

As also shown in FIG. 4, the bipolar plate assemblies may include both anode and cathode flow fields, with the flow fields being generally opposed to each other on opposite faces of the bipolar plate assemblies. This construction enables a single bipolar plate assembly 57 to provide structural support and contain the flow fields for a pair of adjacent MEAs. For example, and as illustrated in FIG. 4, bipolar plate assembly 60 includes anode flow field 88 and a cathode flow field 90', and bipolar plate assembly 64 includes cathode flow field 90 and an anode flow field 88'. Although many, if not most or even all, of the bipolar plate assemblies within a stack will have the same or a similar construction and application, it is within the scope of the disclosure that not every bipolar plate assembly within stack 24 contains the same structure, supports a pair of MEAs, or contains oppositely facing flow fields. As an illustrative, non-exclusive example, a pair of adjacent bipolar plate assemblies may define one or more heat exchange conduits between a pair of MEAs. These heat exchange conduits may be utilized by a thermal management system to deliver liquid heat exchange fluid to the fuel cells.

Somewhat less schematic examples of fuel cell stacks 24 that may be used with thermal management systems according to the present disclosure are shown in FIGS. 5 and 6. As shown, fuel cell stack 24 includes a plurality of fuel cells 20 supported between end plates 12 and 14. Each cell is individually configured to convert fuel and an oxidant into an electrical output. The fuel cells are electrically coupled in series, although it is within the scope of the disclosure to couple the cells in parallel or in a combination of series and parallel. When electrically coupled, the cells collectively provide an electrical potential that is dependent on the configuration of the stack. For example, if all cells of the fuel cell stack are electrically coupled in series, the electrical potential provided by the stack is the sum of the cells' respective potentials. Therefore, if each fuel cell produces 0.6 volts, then a stack having ten cells in series would have an output of 6 volts, a stack with fifty cells would have a power output of 30 volts, a stack with one hundred cells would have a power output of 60 volts, etc.

In the illustrative, non-exclusive example shown in FIG. 6, the fuel cells of fuel cell stack 24 are in fluid communication with each other, such that flows of hydrogen gas (or another suitable fuel) and air (or another suitable oxidant) may be delivered to the respective fuel cells in the fuel cell stack, and exhaust streams may be removed from the fuel cells, via common delivery and exhaust manifolds. In the illustrated example shown in FIG. 6, the manifolds are shown being configured to deliver hydrogen gas 42 in hydrogen stream 66 and oxygen gas 44 in oxygen stream 92 and to withdraw the anode and cathode exhaust streams 54 and 55 via ports associated with the end plates of the fuel cell stack. The streams of hydrogen and oxygen gases are received by the fuel cell stack through input ports 43 and 45. The fuel cell stack includes any suitable structure and/or fluid flow passages for delivering portions of these streams to the respective anode and cathode regions of fuel cells 20. Fuel cell stack 24 also includes outlet ports 67 and 69 through which the anode and cathode exhaust streams from the cells are removed from the fuel cell stack. It is within the scope of the present disclosure that other configurations and constructions may be utilized, but having the ports associated with the end plates may be desirable in many applications because of the increased thickness and stability of the end plates.

Fuel cell stacks 24 and/or fuel cell systems 22 according to the present disclosure may, but are not required to, also include a humidification region in which at least the air or other oxidant stream for the cathode regions is humidified, such as through exposure to a water-containing stream. An illustrative, non-exclusive example of such a stream is the cathode exhaust stream from the fuel cell stack, although others may be used. This exchange may be accomplished by passing the streams, within or external of the fuel cell stack, through a humidification assembly that includes a humidification membrane through which water may pass from the cathode exhaust (or other water-containing) stream to the air or other oxidant stream. Any suitable humidification mechanism may be used. In some embodiments, fuel cell stack 24 will include a plurality of humidification cells, or plates, in which the humidification of the air or other oxidant stream delivered to the fuel cell stack is humidified prior to being distributed to the fuel cells within the fuel cell stack. It is also within the scope of the present disclosure that the oxidant stream may be sufficiently humidified prior to delivery to the fuel cell stack.

The fuel cells in fuel cell stack 24 may be supported and compressed together between the end plates by a stack compression assembly 100. Compression assembly 100 is adapted to draw the end plates toward each other and thereby apply compression to the fuel cells in a direction transverse to the faces, or planes, of the generally planar fuel cells. This is schematically illustrated with arrows in FIGS. 5 and 6. This compression urges the fuel cells together to maintain effective seals and electrical contacts between the components of the stack, as well as the components of the individual cells. The amount of compression to be applied may vary according to such factors as the construction of the fuel cells, including the type of gaskets used to form seals, the construction of the gas diffusion layers used in the cells, the desired operating conditions of the fuel cell stack, etc. The degree of compression, if any, required or desired for a particular fuel cell stack 24 may vary without departing from the scope of the present disclosure.

Any suitable number and type of mechanisms may be utilized to provide the desired compression to the fuel cells in stack 24. For example, the fuel cell stack may include tie rods that extend through a series of bores in the end plates to support and compress the fuel cells together between the end plates. By threading bolts or other fasteners on the ends of the tie rods, compressive forces are applied between the end plates and to the fuel cells to provide seals between the various regions of the fuel cells and the various components of the fuel cell stacks. In addition to extending through the end plates, the tie rods may also extend through portions of the individual fuel cells or around the outer perimeters of the fuel cells. Illustrative, non-exclusive examples of fuel cell stacks utilizing compression assemblies that include tie rods are disclosed in U.S. Pat. Nos. 5,484,666 and 6,057,053, the complete disclosures of which are hereby incorporated by reference. Additional illustrative, non-exclusive examples of suitable compression assemblies that may, but are not required to be, used with fuel cell stacks according to the present disclosure are disclosed in U.S. Patent Application Publication No. 2006/0093890, the complete disclosure of which is hereby incorporated by reference. It is within the scope of the present disclosure that any suitable type and/or number of compression assemblies may be utilized.

In the illustrative example of a fuel cell stack 24 shown in FIG. 6, the fuel cell stack includes at least one inlet port 61 and at least one outlet port 63 through which liquid heat exchange fluid 142 is respectively delivered and removed from the fuel cell stack by a thermal management system 130 according to the present disclosure. The liquid heat exchange fluid may be delivered via any suitable mechanism, and at least in the context of thermal management systems 130 according to the present disclosure, will typically form a closed heat exchange assembly in which a liquid heat exchange fluid is selectively delivered in thermal communication with the fuel cells in the fuel cell stack and then recycled to a liquid reservoir and/or redelivered to the fuel cell stack. As discussed, the liquid heat exchange fluid may be utilized during operation of the fuel cell system to remove the heat produced during operation of the fuel cell stack. As also discussed, thermal management systems 130 according to the present disclosure may be adapted to utilize the liquid heat exchange fluid to heat the fuel cells during startup of the fuel cell system, including when the fuel cell stack is at a subfreezing temperature. As used herein, "subfreezing" refers to a temperature that is below the freezing point of the liquid heat exchange fluid being utilized by the thermal management system.

In the schematic examples shown in FIG. 6, the inlet and outlet ports are respectively illustrated on end plates 12 and 14. While this construction is not required, the relative thickness and stability of the end plates makes them suitable for the inclusion of these ports. It is within the scope of the present disclosure that the ports may be formed in any suitable location on the stack. For example, the ports may all extend through the same end plate, at least one inlet port and at least one outlet port may extend through the same end plate, at least one of the ports may extend through a portion of the fuel cell stack other than the end plates, etc.

Figure 7:
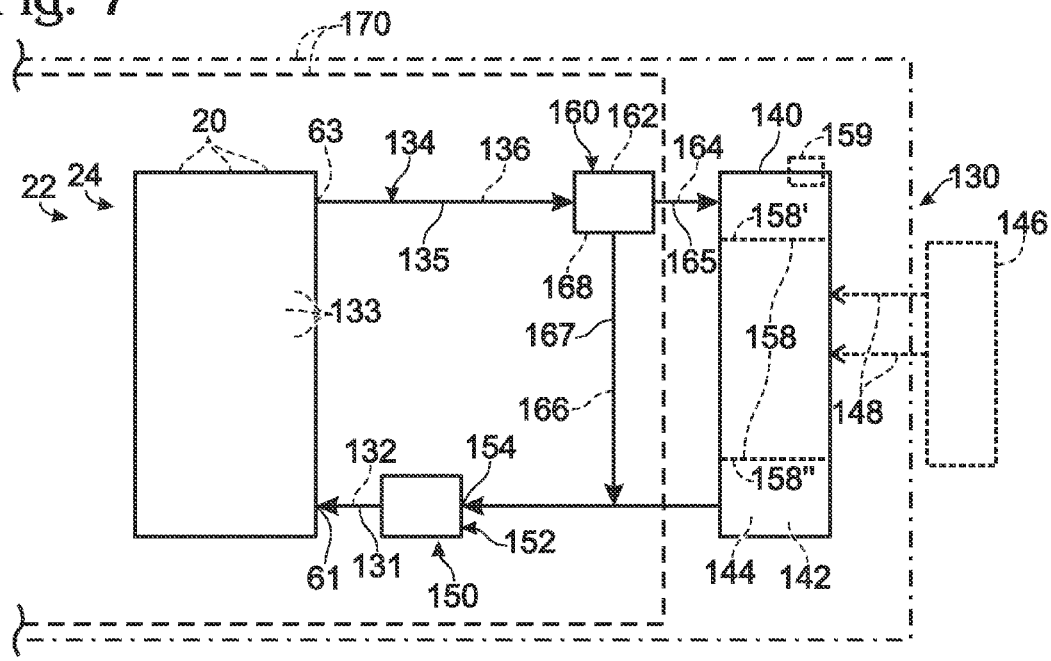
FIG. 7 is a schematic view of a fuel cell system with an illustrative example of a thermal management system according to the present disclosure.

In FIG. 7, an example of a fuel cell system 22 that includes at least one fuel cell stack 24 and a thermal management system 130 according to the present disclosure is schematically illustrated. As discussed, thermal management system 130 includes a liquid reservoir 140 that contains a volume of liquid heat exchange fluid 142. System 130 is adapted to selectively deliver a stream 132 of liquid heat exchange fluid 142 into thermal communication with at least the fuel cells of fuel cell stack 24. The thermal management system is further adapted to withdraw the liquid heat exchange fluid from the stack as a recycled liquid heat exchange fluid stream, or recycle stream, 136. Streams 132 and 136 form portions of heat exchange circuit 134, which may also be referred to as a liquid heat exchange fluid loop. As discussed, the fuel cell system shown in FIG. 7 has been schematically illustrated. Accordingly, the relative size, dimensions, location, and orientation of the components shown therein may vary without departing from the scope of the present disclosure.

By "thermal communication," it is meant that the liquid heat exchange fluid is delivered sufficiently proximate the fuel cells to heat or cool the fuel cells, depending upon the relative temperatures of the fuel cells and the liquid heat exchange fluid. For example, when the fuel cell stack is operating within or above its desired operating temperature, the liquid heat exchange fluid (and thermal management system 130) may be utilized to cool the fuel cells by removing heat therefrom. However, at least during startup of the fuel cell system when the fuel cell stack is at a subfreezing temperature, the thermal management system may be used to heat the fuel cells in the fuel cell stack by providing heat thereto. As an illustrative, non-exclusive example, the liquid heat exchange fluid may be delivered to one or more input ports 61 of the fuel cell stack and distributed into thermal communication with the fuel cells through any suitable distribution mechanisms, such as by distributing the fluid through cooling plates, or channels, that extend through the fuel cell stack, through heat exchange conduits that extend through the stack, etc. These plates and/or conduits may be described as forming a portion of heat exchange circuit 134. The distributed liquid heat exchange fluid may thereafter be withdrawn from the fuel cell stack, such as through one or more output ports 63.

Liquid heat exchange fluid 142, which may also be referred to as heat exchange liquid 142 and/or liquid 142, preferably is selected to be chemically and thermally stable at the operating conditions experienced during operation of the fuel cell stack, as well as at the ambient, or environmental, conditions experienced in the location where the fuel cell system is located. The heat exchange liquid may be selected so as not to change state (i.e., freeze or vaporize) when exposed to these operating and/or environmental conditions. Illustrative, non-exclusive examples of suitable liquid heat exchange fluids include water, propylene glycol, ethylene glycols, other glycols, silicone oils, other oils, mixtures containing at least one of the preceding examples, thereof, etc. As an illustrative example, the heat exchange fluid may be selected to be a liquid at temperatures above 0° C. and below 100° C., at temperatures in the range of 10° C. and 90° C., at temperatures in the range of 10° C. and 80° C., at temperatures in the range of −20° C. and 100° C., at temperatures in the range of −10° C. and 90° C., etc.

In some embodiments, it may be desirable for the heat exchange liquid to be a water-based liquid, to be at least substantially pure water, and/or to be deionized water. In some embodiments, it may be desirable for the liquid heat exchange fluid to be selected to be a fluid that will not poison the catalyst in the fuel cell's anode and/or cathode regions, degrade or damage gaskets or other sealing mechanisms in the fuel cell stacks, and/or otherwise negatively impact the performance of the fuel cell stack if it comes into contact with the fuel cell stack's electrodes and/or gaskets or other sealing mechanisms. For example, in some fuel cell stacks, the liquid heat exchange fluid may contact the catalyst(s) of the fuel cells due to the (micro)porosity of the materials from which the bipolar plates or other fuel cell components are formed, small leaks in the gaskets or other sealing mechanisms that are used in the fuel cells, differences in coefficients of thermal expansion of components of the fuel cell stack, and the like. As an illustrative example, some glycols, including propylene glycol, have demonstrated a potential for damaging or otherwise impairing the performance of the seals and catalysts of a fuel cell stack. Therefore, the use of glycols as a heat exchange fluid is not precluded from all embodiments, in some embodiments it may be desirable to use a different liquid heat exchange fluid, with illustrative, non-exclusive examples including a water-based liquid, at least substantially pure water, and deionized water.

Liquid reservoir 140 may include any suitable type and number of vessels and/or fluid conduits that are adapted to contain a volume of heat exchange fluid 142 that is not being circulated to and/or from the fuel cell stack in circuit 134. In FIG. 7, liquid reservoir 140 is illustrated as a single vessel, but it is within the scope of the present disclosure that more than one vessel may be used, that the reservoir may include fluid conduits other than the conduits through which streams 132 and 136 flow, that the vessel may be at least partially formed from a coiled or otherwise consolidated length of fluid conduit, etc. Although not required, reservoir 140 will typically contain a volume of heat exchange fluid 142 that is at least 50% of the volume of liquid heat exchange fluid 142 present in streams 132 and 136, if not as much fluid or even more fluid than is present in these streams. For example, the reservoir may be sized to contain at least 50%, 100%, 200%, 300% or more of fluid 142 than may be present elsewhere in circuit 134 and/or fuel cell stack 24. In other words, the liquid reservoir may be sized to hold at least 50% more liquid heat exchange fluid than the maximum volume of liquid heat exchange fluid that the heat exchange circuit is adapted to contain. Reservoir 140 may, but is not required to, further include an optional mixing assembly 144 that is adapted to selectively circulate the fluid within the reservoir without requiring circulation of the fluid through heat exchange circuit 134. Illustrative examples of suitable devices for mixing assembly 144 include one or more pumps that are adapted to circulate the fluid within reservoir 140 and/or mixing vanes or other suitable mechanisms that are driven to circulate the fluid within the reservoir. Circulation of the fluid within the reservoir assists in maintaining the fluid at an equilibrium temperature and/or within a narrower temperature range than if the fluid was not circulated.

In FIG. 7, a delivery mechanism 150 is illustrated and schematically depicts any suitable mechanism(s) or device(s) that is/are adapted to propel the liquid heat exchange fluid through the heat exchange circuit. An illustrative, non-exclusive example of a suitable delivery mechanism 150 is a liquid pump, or a liquid pump assembly, 152. Illustrative types of pumps include positive displacement pumps, direct drive pumps, magnetic coupling pumps, etc. It is within the scope of the present disclosure that delivery mechanism 150 may include more than a single pump or other device adapted to selectively propel liquid heat exchange fluid 142 through the heat exchange circuit.

Pump 152 and/or delivery mechanism 150 may be positioned in any suitable relative location and/or orientation relative to the liquid reservoir and fuel cell stack. In some embodiments, it may be desirable for an intake port 154 of the pump or other delivery mechanism to be in fluid communication with the liquid reservoir at a position sufficient that only liquid heat exchange fluid 142 will be drawn from the liquid reservoir to form liquid heat exchange fluid stream 132.

For example, when delivery mechanism 150 is initially utilized to draw liquid heat exchange fluid from liquid reservoir 140 after a period of non-use, the heat exchange circuit, including the heat exchange conduits within fuel cell stack 24, may include air that is returned to the liquid reservoir, such as in the fluid conduit through which recycle stream 136 (and optionally stream 164) flow from the fuel cell stack to the liquid reservoir.

In some embodiments, it may be desirable for the liquid reservoir to be sized so that it contains a sufficient volume of liquid heat exchange fluid 142 that the outlet 156 through which the liquid heat exchange fluid is drawn by delivery mechanism 150 is maintained beneath the surface of the liquid heat exchange fluid even when the entire heat exchange conduit assembly contains liquid heat exchange fluid that was drawn from the liquid reservoir. In FIG. 7, this surface is schematically indicated at 158. At 158', the liquid level is schematically indicated when the thermal management system is not being used to circulate liquid heat exchange fluid to the fuel cell stack via heat exchange circuit 134, and at 158" the liquid level is schematically indicated when the thermal management system is being used to circulate liquid heat exchange fluid to the fuel cell stack. As shown, level 158" is positioned above outlet 156, thereby schematically depicting that liquid reservoir 140 contains liquid heat exchange fluid in the region beneath level 158", thereby preventing air from being drawn through outlet 156. In some embodiments, it may be desirable for liquid reservoir 140 to be vented or otherwise open to the environment to permit equalization of air pressure within and external to the liquid reservoir. For example, liquid reservoir 140 may include a vent 159, as is schematically indicated in FIG. 7.

As also shown in FIG. 7, thermal management systems 130 according to the present disclosure may include an optional distribution assembly 160 that contains at least one valve, or other suitable flow-regulating device, 162 that is adapted to selectively apportion, or adjust the respective percentages of, the liquid heat exchange fluid in recycle stream 136 between a stream 164 that is returned to liquid reservoir 140 and a stream 166 that is reused as at least a portion of liquid heat exchange stream 132 without first being returned to the reservoir. Stream 164 may be described as being a portion of recycle stream 136, and stream 166 may be described as being a slipstream, or diverted, stream from the recycle stream. Accordingly, distribution assembly 160 may additionally or alternatively be described as being adapted to divert at least a portion of recycle stream 136, which otherwise would be returned to liquid reservoir 140 prior to being reused to form liquid heat exchange stream 132, to form at least a portion of stream 132 without first returning the diverted stream 166 of fluid 142 to the liquid reservoir. Stream 166 may be referred to as a shunt stream or a direct-recycle stream because the stream is reused to form at least a portion of liquid heat exchange stream 132 without being returned to the liquid reservoir and mixed with the volume of heat exchange fluid contained therein. Additionally or alternatively, distribution assembly 160 may be configured to selectively apportion the recycle stream between stream 164, which is cooled by a suitable heat exchange assembly prior to being returned to the liquid reservoir and/or reused to form at least a portion of liquid heat exchange stream 132, and a diverted stream 166 that is not cooled by a heat exchange assembly prior to being returned to the liquid reservoir and/or reused to form at least a portion of liquid heat exchange stream 132.

Distribution assembly 160, when present, may include any suitable type and/or number of valves or other flow-regulating devices 162 that are adapted to selectively divert at least a portion of recycle stream 136 to form shunt stream 166. The selective apportionment, or division, of recycle stream 136 may vary between such illustrative configurations as a configuration in which all of the fluid in recycle stream 136 is returned to reservoir 140, a configuration in which a portion, but not all, of the fluid in recycle stream 136 is returned to the reservoir in stream 164 and a portion, but not all, of the fluid in recycle stream 136 is diverted to form shunt stream 166, and a configuration in which all of the fluid in recycle stream 136 is diverted to shunt stream 166. While within the scope of the present disclosure, it is not required that these configurations include configurations in which all of the recycle stream is diverted and/or all of the recycle stream is recycled without diversion of any portion of the stream. The portion of the recycle stream that is diverted to form shunt stream 166 therefore may vary between none and all of the recycle stream, and during use of the thermal management system may selectively form a minority of the recycle stream, a majority of the recycle stream, at least 10% of the recycle stream, at least 30% of the recycle stream, at least 50% of the recycle stream, at least 75% of the recycle stream, at least 90% of the recycle stream, etc.

Although it is within the scope of the present disclosure to include manual and/or electrically controlled valves or other flow-regulating devices 162, it is also within the scope of the present disclosure for distribution assembly 160, when present, to utilize a valve or other flow-regulating device that is adapted to automatically apportion the liquid in recycle stream 136 between streams 164 and 166 without requiring manual or electronic inputs. An illustrative example of such a device is a thermostatic valve, as graphically indicated in FIG. 7 at 168. Thermostatic valve 168 is adapted to automatically apportion the liquid heat exchange fluid in stream 136 between streams 164 and 166 responsive at least in part to the temperature of fluid 142 in the recycle stream. Distribution assembly 160 may be referred to as a thermostatic distribution assembly in embodiments in which it includes at least one thermostatic valve or other thermostatic flow-regulating device that is adapted to selectively apportion the flow of recycle stream 136 without requiring manual or electronic inputs to the distribution assembly. For example, when the temperature of the fluid in the recycle stream is below a minimum threshold temperature, the thermostatic valve may be adapted to divert at least a majority, if not all, of the recycle stream to shunt stream 166. Additional illustrative, non-exclusive examples of distribution assemblies 160 are disclosed in U.S. Patent Application Publication No. 2007/0042247, the complete disclosure of which is hereby incorporated by reference.

In FIG. 7, heat exchange circuit 134 is shown including a plurality of fluid conduits that establish flow paths through which the liquid heat exchange fluid may flow, such as from the liquid reservoir to the fuel cell stack, through the fuel cell stack, from the fuel cell stack to the liquid reservoir, etc. The specific number, type, and orientation of these fluid conduits may vary without departing from the scope of the present disclosure. Illustrative, non-exclusive examples include at least one delivery conduit 131 through which heat exchange stream 132 flows from the liquid reservoir to the fuel cell stack, fuel cell heat exchange conduit 133 through which the liquid heat exchange fluid flows through the fuel cell stack, recycle conduit 135 through which the liquid heat exchange fluid is withdrawn from the fuel cell stack, bypass conduit 167 through which the portion of the recycle stream that is diverted by distribution assembly 160 flows, and conduit 165 through which the portion of the recycle stream that is not diverted by the distribution assembly flows.

As illustrated in dashed lines in FIG. 7, liquid reservoir 140 may be in thermal communication with a heat exchange assembly 146 that is adapted to selectively or continuously deliver at least one heat exchange stream 148 into thermal communication with at least one of the liquid reservoir and the recycle stream of the thermal management system to selectively heat or cool the reservoir (and any liquid heat exchange fluid 142 therein, such as depending upon the relative temperature of stream 148 and the liquid reservoir and the liquid heat exchange fluid). Heat exchange assembly 146 may be selectively referred to as a portion of the fuel cell system and/or of the thermal management system. As an illustrative, non-exclusive example, during use of the thermal management system at least in conditions where the fuel cell system is operating at steady state conditions, liquid heat exchange fluid 142 being returned to the reservoir in recycle stream 136 may need to be cooled before it is at a suitable temperature to be reused in stream 132 (i.e., at a sufficiently lower temperature than the fuel cells in stack 24 to be able to remove sufficient heat from the fuel cells to maintain the fuel cells below a threshold maximum operating temperature). As another illustrative, non-exclusive example, during startup of the fuel cell stack at a subfreezing temperature, heat exchange assembly 146 may be utilized to provide a heat exchange stream 148 that heats the liquid reservoir and liquid heat exchange fluid 142 by having stream 148 have a higher temperature than the temperature of liquid reservoir 140 and/or fluid 142. In other embodiments, such as where heat exchange stream 148, if produced, would have a cooler temperature than liquid reservoir 140 and/or fluid 142, then the heat exchange assembly may not be used during startup of the fuel cell stack at subfreezing temperatures or in other situations where stream 148 is cooler than the liquid heat exchange fluid or other component of fuel cell system 22 for which it is desired to provide an increase in temperature.

Heat exchange assembly 146 may include any suitable type and number of mechanism(s) and/or device(s) adapted to selectively or continuously provide at least one heat exchange stream 148 in thermal communication with the liquid reservoir (and the liquid heat exchange fluid contained therein. It is within the scope of the present disclosure that the heat exchange stream 148 may include an air stream, a gas stream, a liquid stream, more than one stream or type of stream, and/or may form open and/or closed heat exchange systems. For example, fans and blowers may be used to deliver air streams drawn from proximate the fuel cell system into thermal communication with the liquid reservoir and/or recycle stream, although other mechanisms and heat exchange fluids may be used without departing from the scope of the present disclosure. As another illustrative, non-exclusive example, a heating assembly may be utilized to deliver a heated heat exchange stream 148 to heat the liquid heat exchange fluid in the liquid reservoir and/or elsewhere in the heat exchange circuit, such as in one or more of streams 132, 136, 164, and 166. As still another illustrative, non-exclusive example, the liquid reservoir may be in thermal communication with fluid conduits and/or components of the fuel cell system that are at a suitable temperature, or range of temperatures, to provide the desired heat exchange with the liquid reservoir, and the liquid heat exchange fluid contained therein.

Fuel cell systems 22 according to the present disclosure may include an optional housing, or shell, 170 in which at least fuel cell stack 24 is located, or housed. When present, housing 170 may enclose other portions of the fuel cell system as well. In dotted lines in FIG. 7, a housing 170 is shown enclosing fuel cell stack 24 and thermal management system 130, including liquid reservoir 140. As indicated in dashed lines in FIG. 7, liquid reservoir 140 may be (but is not required to be) located external of housing 170. In some embodiments, housing 170 may be an insulated housing. In the illustrative, non-exclusive example shown in FIG. 7, the fuel cell stack (and optionally other components of fuel cell system 22) are located within housing 170, while liquid reservoir 140 and heat exchange assembly 146 are located external this housing. This selective use of a common housing for portions of the fuel cell system and/or selective positioning of portions of the thermal management system external of a housing containing at least fuel cell stack 24 is not required to all embodiments and is intended merely to indicate examples of configurations that may be implemented.

As another illustrative, non-exclusive example, and as indicated in dash-dot lines in FIG. 7, in some embodiments it may be desirable to include the liquid reservoir within the housing, such as to provide some insulation against freezing of the liquid heat exchange fluid when the fuel cell system is located in an environment where the temperature may be at or below the freezing point of the liquid heat exchange fluid and/or against overheating of the liquid heat exchange fluid when the fuel cell system is located in an environment where the temperature may be above a suitable temperature for the liquid heat exchange fluid and/or liquid reservoir. In embodiments in which the liquid reservoir is located within housing 170, a heat exchange assembly 146 also may be located within the housing, may be located external the housing, and/or may be integrated into the housing, such to draw air from external the housing through the housing to form stream 148 and/or to draw air from with the housing out of the housing. When a heat exchange assembly is located external housing 170, it may be configured to deliver a heat exchange stream 148 into the housing, such as through a suitable type and number of passages in the housing, and/or to selectively heat or cool a portion of the liquid heat exchange fluid, such as in (recycle) stream 136 or 164 that is passed outside of the housing for heat exchange with heat exchange assembly.

As discussed, fuel cell systems may be used in a variety of environments, some of which are at, or have, an ambient temperature that is within the range of selected, or desired, operating temperatures for fuel cell stack 24, some of which are at an ambient temperature that is near, but not within, the range of selected operating temperatures for fuel cell stack 24, and some of which that are much hotter or colder than the range of selected operating temperatures for fuel cell stack 24. When the ambient temperature is within or near this range of selected operating temperatures, a thermal management system should be able to effectively maintain the fuel cell stack within the desired range of operating temperatures during operation of the fuel cell stack. However, when the temperature difference between the ambient temperature (i.e., the temperature of the environment and/or air in which the fuel cell system is located) and the range of selected operating temperatures increases, the ability of the fuel cell system to initiate and/or maintain the production of the fuel cell stack's electrical output may be impaired. One potential reason for this is that the thermal management system may not effectively distribute liquid heat exchange fluid to the fuel cell stack to control and/or regulate the temperature of the fuel cells within the stack.

As a particular example, some fuel cell systems may be used in an environment in which the ambient temperature is below the freezing point of water or the other liquid heat exchange fluid used in thermal management system 130. In such a subfreezing environment, startup and/or operation of the fuel cell system to produce and maintain the desired electrical output by the fuel cell stack may be temporarily or permanently impaired, or even prevented. As discussed, this may be due to fuel cell stack 24 and/or thermal management system 130 being at a temperature that is below the freezing point of the liquid heat exchange fluid used therein. Consider, for example, a fuel cell system with a fuel cell stack 24 and a thermal management system 130 with a liquid heat exchange fluid 142 that is present in an environment having a subfreezing temperature. If the fuel cell system is not presently being utilized to produce an electrical output (and thus operating within the selected range of operating temperatures), and/or is not otherwise maintained above a subfreezing temperature within the subfreezing environment, then at least a portion of the liquid heat exchange fluid in the fuel cell system may be frozen. Similarly, the liquid heat exchange fluid may become frozen when thermal management system 130 attempts to distribute the liquid heat exchange fluid to the fuel cell system with heat exchange circuit 134.

In view of the above, fuel cell systems 22 according to the present disclosure may, but are not required to, include at least one of a heating assembly 172 and a thermal management system 130 that provides for automatic withdrawal of liquid heat exchange fluid 142 from the fuel cell stack and heat exchange circuit upon shutdown of the fuel cell system and/or interruption of the operation of delivery mechanism 150.

Figure 8:
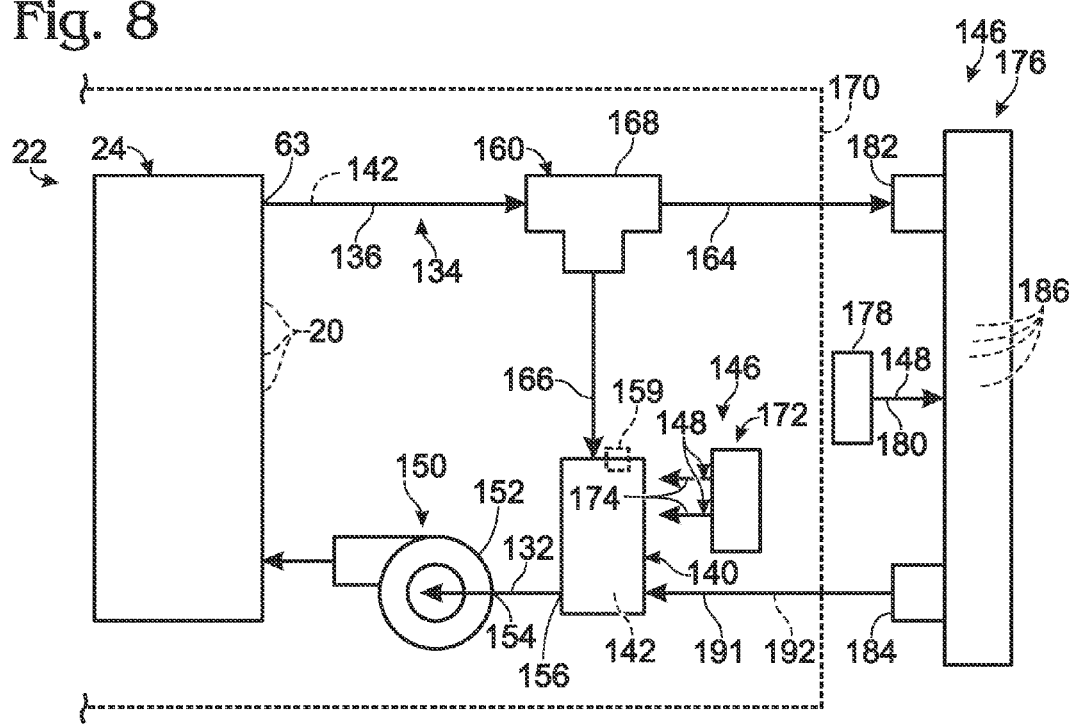
FIG. 8 is a schematic view of a fuel cell system with another illustrative example of a thermal management system according to the present disclosure.

When present, heating assembly 172 may be adapted to maintain at least one of fuel cell stack 24, heat exchange circuit 134, and liquid reservoir 140 (and thus liquid heat exchange fluid 142) above a minimum temperature. Illustrative, non-exclusive examples of suitable minimum temperatures may include the freezing point of the liquid heat exchange fluid, the freezing point of water, and a temperature within a predetermined range of either of these representative temperatures, such as +/−5° C., +/−10° C., +/−20° C., +30° C., +40° C., +10 to +30° C., +20 to +50° C., +25 to +40° C., etc. FIG. 8 provides a schematic graphical representation that it is within the scope of the present disclosure for thermal management system 130 and/or fuel cell system 22 may include such a heating assembly 172. Heating assembly 172 may, but is not required to, be described as an example of a heat exchange assembly 146, with heating assembly 172 in some embodiments producing a heated heat exchange stream 148. However, heating assembly 172 also may heat components of the fuel cell system through other heat transfer mechanism without departing from the scope of the present disclosure. When fuel cell system 22 includes a housing 170, the heating assembly may be located within the housing and/or configured to produce heat within the housing. It is also within the scope of the present disclosure that the heating assembly may be located external to the housing or otherwise configured to heat components of the fuel cell system that are located external the housing. In some embodiments, the heating assembly may be configured primarily to heat the liquid reservoir (and the liquid heat exchange fluid contained therein).

Heating assembly 172, when present, may be adapted to produce heat continuously or periodically. Illustrative, non-exclusive examples include a heating assembly that produces heat only during startup of the fuel cell system, that produces heat continuously, that produces heat continuously when the fuel cell system is in an idle configuration or an off, shutdown, dormant, or other configuration in which the fuel cell stack is not producing an electrical output, that produces heat when at least one selected component of the fuel cell system (such as the fuel cell stack, liquid reservoir, liquid heat exchange fluid) or the ambient temperature is below a threshold minimum temperature, etc.

Heating assembly 172 may utilize any suitable mechanism and/or structure to produce heat to provide the desired heating of one or more components of the fuel cell system. Illustrative, non-exclusive examples include heating assembly 172 including an electrically powered resistive heater, a combustion heater (e.g., a gas heater), an infrared lamp, a Peltier device, and the like. When heating assembly 172 includes a resistive heater, the resistive heater may be an electrically powered heater. Power for the heater may be provided from any suitable source, such as one of the previously discussed energy-storage devices 78, a battery that is not adapted to be recharged by the electrical output from the fuel cell stack, or a separate power source. When the heating assembly includes a combustion heater, it may receive a combustible fuel stream, and optionally an air stream, from any suitable sources to produce a heated exhaust stream. Additional illustrative, non-exclusive examples of mechanisms for maintaining the fuel cell system at a suitable temperature, or within a suitable range of temperatures, are disclosed in U.S. Patent Application Publication No. 2007/0065689, the complete disclosure of which is hereby incorporated by reference.

FIG. 8 also provides an illustrative, non-exclusive graphical example of a fuel cell system 22 that includes a thermal management system 130 with/and a heat exchange assembly 146 that is adapted to cool at least a portion of recycle stream 136, such as stream 164, and thereby also cool the liquid heat exchange fluid in liquid reservoir 140 when this stream is returned to the liquid reservoir. In FIG. 8, various previously discussed components of fuel cell system 22 have been illustrated and are not discussed again in the context of FIG. 8. It is within the scope of the present disclosure that these components may, but are not required to be, used with the heat exchange assembly of FIG. 8, and that the components of the heat exchange assembly of FIG. 8 may be used with other fuel cell systems 22 and/or thermal management systems 130 that are described, illustrated, and/or incorporated herein. In FIG. 8, the fluid conduits that form heat exchange circuit 134 are shown further including a return conduit 191 through which a return stream 192 of the liquid heat exchange fluid is returned to the liquid reservoir after heat exchange with a heat exchange assembly.

As illustrated in FIG. 8, heat exchange assembly 146 is located external housing 170 and takes the form of a radiative cooling assembly 176. As illustrated, the radiative cooling assembly utilizes one or more fans, blowers, or other suitable air propulsion mechanisms, 178 to provide a heat exchange stream 148 in the form of an air stream 180 for cooling the liquid heat exchange fluid 142 that flows through the radiative cooling assembly. As illustrated, the radiative cooling assembly, which also may be referred to as a radiator assembly, includes an inlet 182, an outlet 184, and a plurality of spaced-apart conduits 186 through which the liquid heat exchange fluid may flow and between which air stream 180 may flow to cool the liquid heat exchange fluid. Conduits 186 may have any suitable size, orientation, and number, and may include heat transfer fins or other suitable structure for increasing the heat transfer surface between the conduits and the air stream (or other heat exchange stream) from cooling assembly 176.

When present in fuel cell system 22, a thermal management system 130 that provides for automatic withdrawal of liquid heat exchange fluid 142 from the fuel cell stack and heat exchange circuit upon shutdown of the fuel cell system and/or interruption of the operation of delivery mechanism 150 may be utilized to reduce the likelihood that water (or other liquid heat exchange fluid) freezes and damages the fuel cell stack and/or heat exchange circuit. For example, if a sufficient volume of water (or another liquid heat exchange fluid that expands when frozen) is present in the heat exchange circuit, such as within the heat exchange conduits within the fuel cell stack or within the external conduits through which at least streams 132 and 134 flow, these structures may be damaged if the water or other liquid freezes.

Accordingly, thermal management system 130 may be configured to automatically drain or otherwise withdraw the liquid heat exchange fluid from the heat exchange conduit, such as when pump 152 or other delivery mechanism 150 is not being utilized to propel the liquid heat exchange fluid through the heat exchange circuit. In some embodiments, these thermal management systems may be referred to as self-draining thermal management systems. While such a liquid removal mechanism may be configured to remove all of the liquid heat exchange fluid from the heat exchange circuit, this is not required to all embodiments. For example, in some embodiments, it may be acceptable for sufficient liquid to be removed from the heat exchange circuit that the remaining liquid, if frozen, will not deform, damage, and/or obstruct portions of the heat exchange circuit and/or fuel cell stack. In some embodiments, removal of at least 25% of the liquid heat exchange fluid may be sufficient, in some embodiments, removal of at least 50%, or at least 75% may be sufficient. It is also within the scope of the present disclosure for all of the liquid heat exchange fluid to be removed by such a drainage assembly or drainage mechanism. The removal of the liquid heat exchange fluid may be accomplished via any suitable mechanism, including gravity flow of the liquid out of the heat exchange circuit, suction of the liquid from the circuit, and displacement or propulsion of the liquid from the circuit. The withdrawn liquid heat exchange fluid may be returned to the liquid reservoir, although this is not required for all embodiments.

Figure 9:
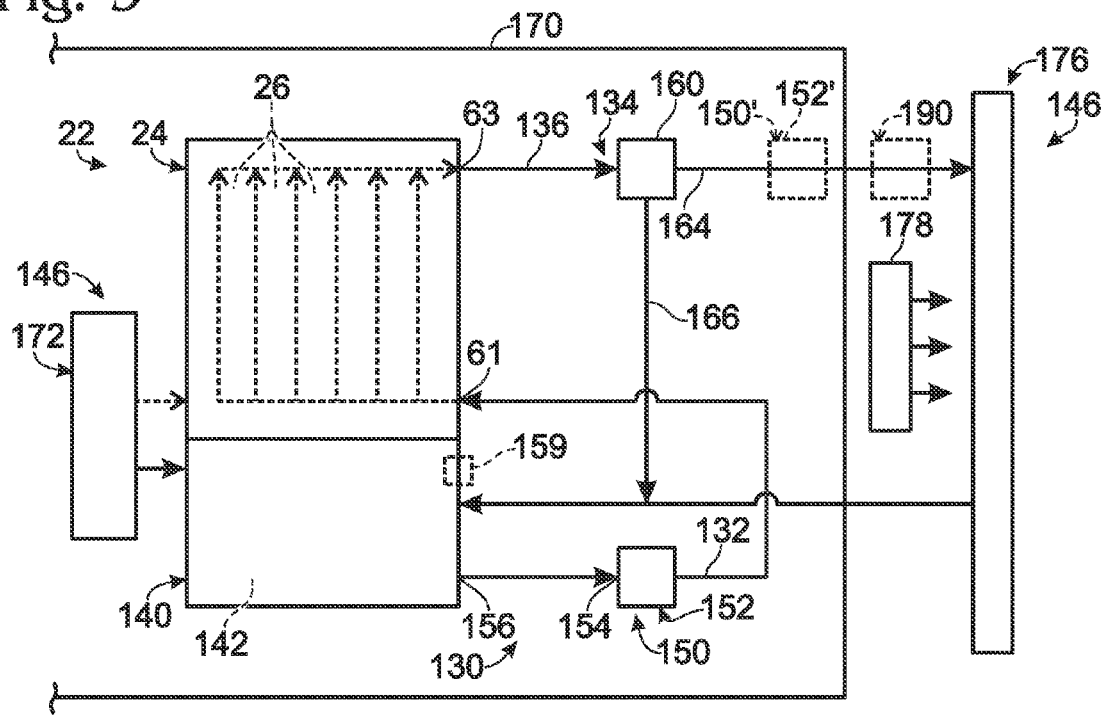
FIG. 9 is a schematic view of a fuel cell system with another illustrative example of a thermal management system according to the present disclosure.

In FIG. 9, an illustrative, non-exclusive example of a fuel cell system 22 with a fuel cell stack 24 and a thermal management system 130 that is adapted to drain liquid heat exchange fluid from the fuel cell system and heat exchange circuit when pump 152 (or other delivery mechanism 150) is not being used to circulate liquid heat exchange fluid 142 from the liquid reservoir to fuel cell stack 24. In FIG. 9, various previously discussed components of fuel cell system 22 have been illustrated and are not discussed again in the context of FIG. 9. It is within the scope of the present disclosure that these components may, but are not required to be, used with the thermal management system of FIG. 9, and that the components of the thermal management system of FIG. 9 may be used with other fuel cell systems 22 and/or thermal management systems 130 that are described, illustrated, and/or incorporated herein. As illustrative, non-exclusive examples, also shown in FIG. 9 are an optional housing 170 and optional heat exchange assemblies 146, such as a heating assembly 172 and a radiative (cooling) assembly 176. FIG. 9 also provides a graphical, albeit schematic, illustration of heat exchange circuit 134 that includes a plurality of fluid conduits that extend through the fuel cell stack, such as between one or more fuel cells.

In the illustrative example shown in FIG. 9, liquid reservoir 140 is positioned at a lower elevation than fuel cell stack 24 and at least a portion of recycle circuit 134. By "at a lower elevation," it is meant that liquid heat exchange fluid 142 within the fuel cell stack and/or corresponding portion of heat exchange circuit 134 will automatically flow to the liquid reservoir when not otherwise propelled or obstructed by other components of the thermal management system. In the illustrated example, the liquid reservoir is positioned beneath the fuel cell stack, although this relative placement is not required to all embodiments. Accordingly, pump 152 (or other delivery mechanism 150) may be configured to permit the liquid heat exchange fluid to drain, or flow, therethrough and back through the heat exchange circuit to the liquid reservoir. In such an embodiment, this drainage of the liquid heat exchange fluid may occur automatically responsive to the pump not being energized to propel the liquid heat exchange fluid from the liquid reservoir to the fuel cell stack via heat exchange stream 132. It is also within the scope of the present disclosure that pump 152 may be a reversible pump (or that other delivery mechanism 150) is adapted to be able to reversibly propel liquid to or from the liquid reservoir via stream 132.

Thermal management systems 130 according to the present disclosure may additionally or alternatively include a drainage pump or other liquid-propulsion mechanism, as schematically illustrated at 152' and 150' in FIG. 9, which is utilized to withdraw liquid heat exchange fluid 142 from fuel cell stack 24 and heat exchange circuit 134 and to return this fluid to the liquid reservoir. In such an embodiment, this pump or other mechanism may be referred to as a drainage pump or liquid draining mechanism and may be selectively or automatically actuated upon pump 150 or other delivery mechanism 152 not being energized to propel liquid heat exchange fluid from the liquid reservoir to the fuel cell stack.

Additionally or alternatively, thermal management systems 130 according to the present disclosure may include an air, or gas, delivery system 190 that provides an air (or other gas) stream to force liquid heat exchange fluid 142 from the fuel cell stack and heat exchange circuit 134 when it is desirable to remove this liquid. Air delivery system 190, when present, may include any suitable mechanism for generating a gas stream having sufficient pressure to remove the desired amount of liquid from heat exchange circuit 134 and may include or communicate with any suitable one-way, check, or other valve or flow-regulating structure to permit the air (or gas) stream to be selectively introduced into the heat exchange circuit only when it is desirable to utilize the system, and to prevent liquid heat exchange fluid 142 from flowing to the air delivery system.

Operation of such optional air delivery systems and drainage pumps may be manually controlled or may be automated. Furthermore, these components may be programmed or otherwise automatically configured to be operated upon occurrence of a predetermined triggering event, such as de-energization of pump 152 or delivery system 150, upon shutdown of fuel cell system 22, etc. The above-described systems and mechanisms for withdrawing liquid heat exchange fluid from the heat exchange circuit (including the portion of this circuit that extends within the fuel cell stack), may be referred to as means for withdrawing liquid heat exchange fluid from the heat exchange circuit, which as discussed, may be automatic and/or may be responsive to a predetermined triggering event. The mechanisms and systems may additionally or alternatively be referred to as a drainage assembly.

In embodiments of fuel cell systems 22 that are designed for operation at subfreezing temperatures, and which include a thermal management system 130 with/and a heat exchange assembly 146 in the form of a radiative assembly 176, radiative assembly 176 may not be used until the liquid heat exchange fluid that passes through conduits 186 is of a sufficient temperature that it will not freeze in, and thereby obstruct, the conduits. As another approach, the radiative assembly may be designed to prevent the liquid heat exchange fluid that passes through conduits 186 from freezing in, and thereby obstructing, the conduits even though the radiative assembly is being used in subfreezing temperatures. For example, by decreasing the internal diameter, or internal cross-sectional area, of the conduits, greater heat transfer with heat exchange stream 180 may be achieved compared to a similar radiative assembly with a fewer number of larger diameter conduits. However, this relative reduction in the fluid flow through each conduit also increases the likelihood that the liquid heat exchange fluid will freeze in the conduit when the radiative assembly is operated at subfreezing temperatures. Similarly, any fins or other heat transfer surfaces that are helpful during use of the radiative assembly to cool the liquid heat exchange fluid at warmer temperatures may also work against this desire to prevent the liquid from freezing within the conduits when operated at subfreezing temperatures.

Figure 10:
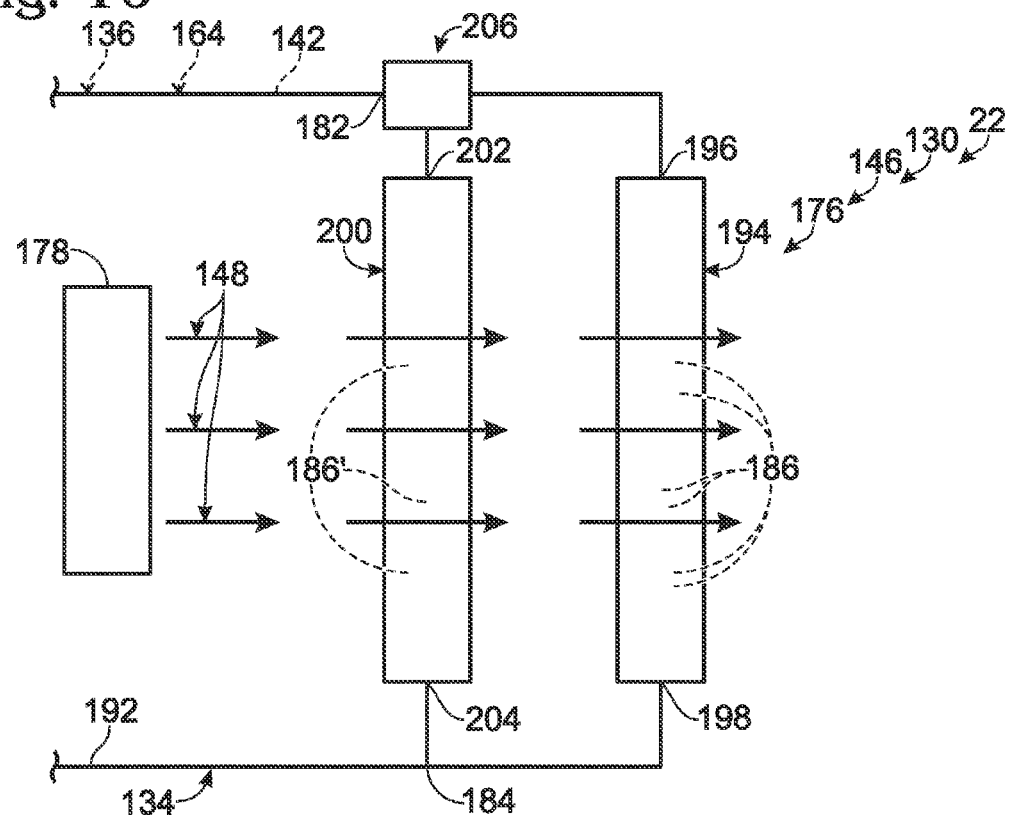
FIG. 10 is a schematic view of a radiative assembly that may be used with fuel cell systems with a thermal management system according to the present disclosure.

An illustrative, non-exclusive example of a suitable construction for radiative assembly 176 is schematically illustrated in FIG. 10. As illustrated, radiative assembly 176 receives a stream containing liquid heat exchange fluid 142 to be cooled, such as recycle stream 136 or (recycle) stream 164 at an inlet 182, and the radiative assembly produces at least one return stream 192 that is returned to the liquid reservoir and/or used to form at least a portion of the liquid heat exchange stream that is delivered to the fuel cell stack via heat exchange circuit 134. The radiative assembly includes a primary radiator 194 with a plurality of conduits 186 through which the liquid heat exchange fluid flows and is cooled, such as with heat exchange stream(s) 148 from heat exchange assembly 146. As discussed, heat exchange assembly 146 may (but is not required to) take the form of a fan, blower, or other air delivery system that produces a heat exchange stream 148 in the form of an air stream. During operation of the radiative assembly when it is not at subfreezing temperatures, at least a majority, if not all, of the liquid heat exchange fluid that is delivered to the radiative assembly may flow through the primary radiative assembly. As illustrated, primary radiator 194 includes an inlet 196, through which liquid heat exchange fluid from stream 136 or 164 flows to conduits 186. The primary radiator also includes an outlet 198, through which the liquid heat exchange fluid exits the primary radiator and forms at least a portion of return stream 192.

The radiative assembly shown in FIG. 10 further includes a bypass, or secondary, radiator 200 with a plurality of conduits 186' through which the liquid heat exchange fluid may selectively flow and, if so, be cooled with heat exchange stream(s) 148 from heat exchange assembly 146. As graphically depicted in FIG. 10, secondary radiator 200 has fewer and/or larger (internal cross-sectional area) conduits 186' than the corresponding conduits 186 of primary radiator 194. The larger internal cross-sectional area of these conduits means that a greater amount of liquid heat transfer fluid may flow therethrough compared to the corresponding conduits of primary radiator 194. Accordingly, even when the liquid heat exchange fluid is introduced into a primary radiator that is at a subfreezing temperature, the liquid should not freeze and obstruct the conduits in the secondary radiator. Instead, the liquid will flow through conduits 186', exit the secondary radiator at outlet 204, and form at least a portion of return stream 192.

When secondary radiator 200 includes fewer conduits than the primary radiator, it may include as illustrative, non-exclusive examples, at least 25% fewer conduits, at least 50% fewer conduits, at least 75% few conduits, etc. Similarly, when secondary radiator 200 includes conduits having larger internal cross-sectional areas than the conduits of the primary radiator, the conduits may have, as illustrative, non-exclusive examples, at least 50% greater internal cross-sectional areas, at least 75% greater internal cross-sectional areas, at least 100% greater internal cross-sectional areas, at least 200% greater internal cross-sectional areas, etc. It should be understood that the references to cross-sectional areas refer to the cross-sectional areas of the conduits, as measured transverse, i.e., perpendicular, to the direction of flow of liquid heat exchange fluid therethrough.

The radiative assembly of FIG. 10 further includes a distribution conduit 206 that provides a flow passage for liquid heat exchange fluid 142 from inlet 182 to inlets 196, 202 of the primary and secondary radiators, respectively. Distribution conduit 206 may be oriented relative to the inlets of the radiators that a majority, or even all, of the liquid heat exchange fluid that is received at inlet 182 flows to the primary radiator so long as there is no obstruction within the conduits 186 of the primary radiator (such as due to the liquid heat exchange fluid freezing in the conduits) and/or so long as the primary radiator has sufficient capacity to receive through conduits 186 the flow rate of liquid heat exchange fluid delivered thereto. However, should the liquid heat exchange fluid not, or not all, be able to flow through conduits 186 of the primary radiator, then the excess amount of the liquid heat exchange fluid may flow through distribution conduit 206 to the inlet of the secondary radiator, through conduits 186' of the secondary radiator, and then form at least a portion of return stream 192.

Like conduits 186' of secondary radiator 200, distribution conduit 206 should be of sufficient internal cross-sectional area (perpendicular to the direction of liquid flow therethrough) that the liquid heat exchange fluid flowing therethrough will not freeze within the conduit, at least so long as the temperature of the conduit is above threshold subfreezing temperature. Illustrative, non-exclusive example of this threshold subfreezing temperature may be at least 10° C., 20° C., 30° C., 40° C., 50° C., or more, below the freezing point of the liquid heat exchange fluid. Because it receives the portion of the recycle stream that cannot flow through primary radiator 194, secondary radiator 200 may be referred to as a bypass radiator and/or as an overflow radiator. Similarly, distribution conduit 206 may be referred to as a bypass conduit and/or an overflow conduit.

In the example shown in FIG. 10, the outlets of the primary and secondary radiators collectively form an outlet 184 for the radiative assembly, although it is within the scope of the present disclosure that the outlet of each radiator may be in fluid communication with the liquid reservoir through a separate fluid conduit, and thereby may define distinct return streams 192. The primary radiator may be described as including, and/or being in fluid communication with, a primary heat exchange conduit assembly that forms a portion of heat exchange circuit 134, and the secondary radiator may be described as including, and/or being in fluid communication with, a secondary heat exchange conduit assembly that forms a portion of heat exchange circuit 134. Conduits 186 and 186' may additionally or alternatively be referred to as radiator conduits and/or as cooling conduits.

Figure 11:
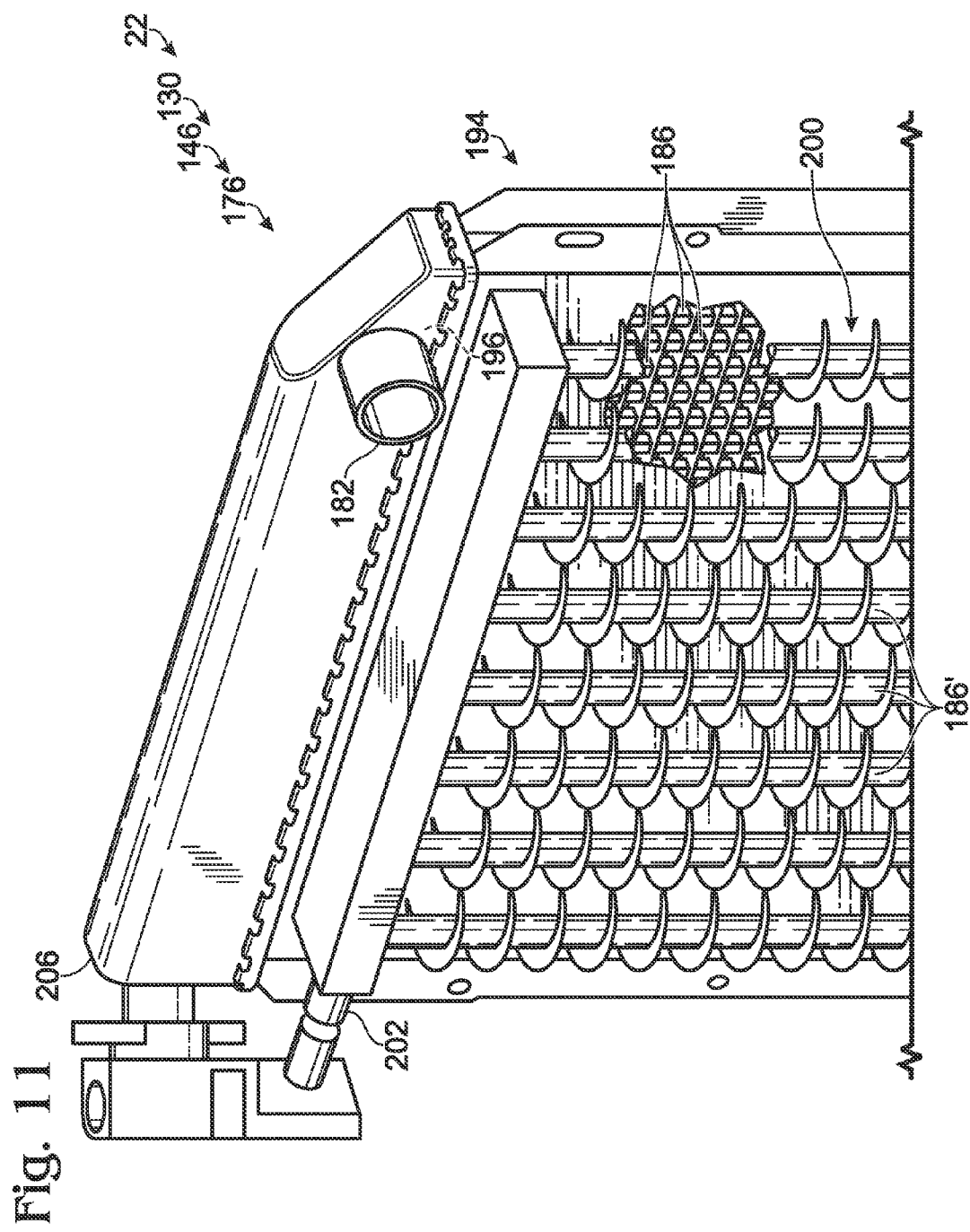
FIG. 11 is a fragmentary isometric view of another radiative assembly that may be used with fuel cell systems with a thermal management system according to the present disclosure.

An illustrative, non-exclusive example of a less schematic embodiment of the radiative assembly of FIG. 10 is shown in FIG. 11. Various components of the radiative assembly of FIG. 10 are labeled in FIG. 11, although they are not discussed again in connection with respect to FIG. 11.

Figure 12:
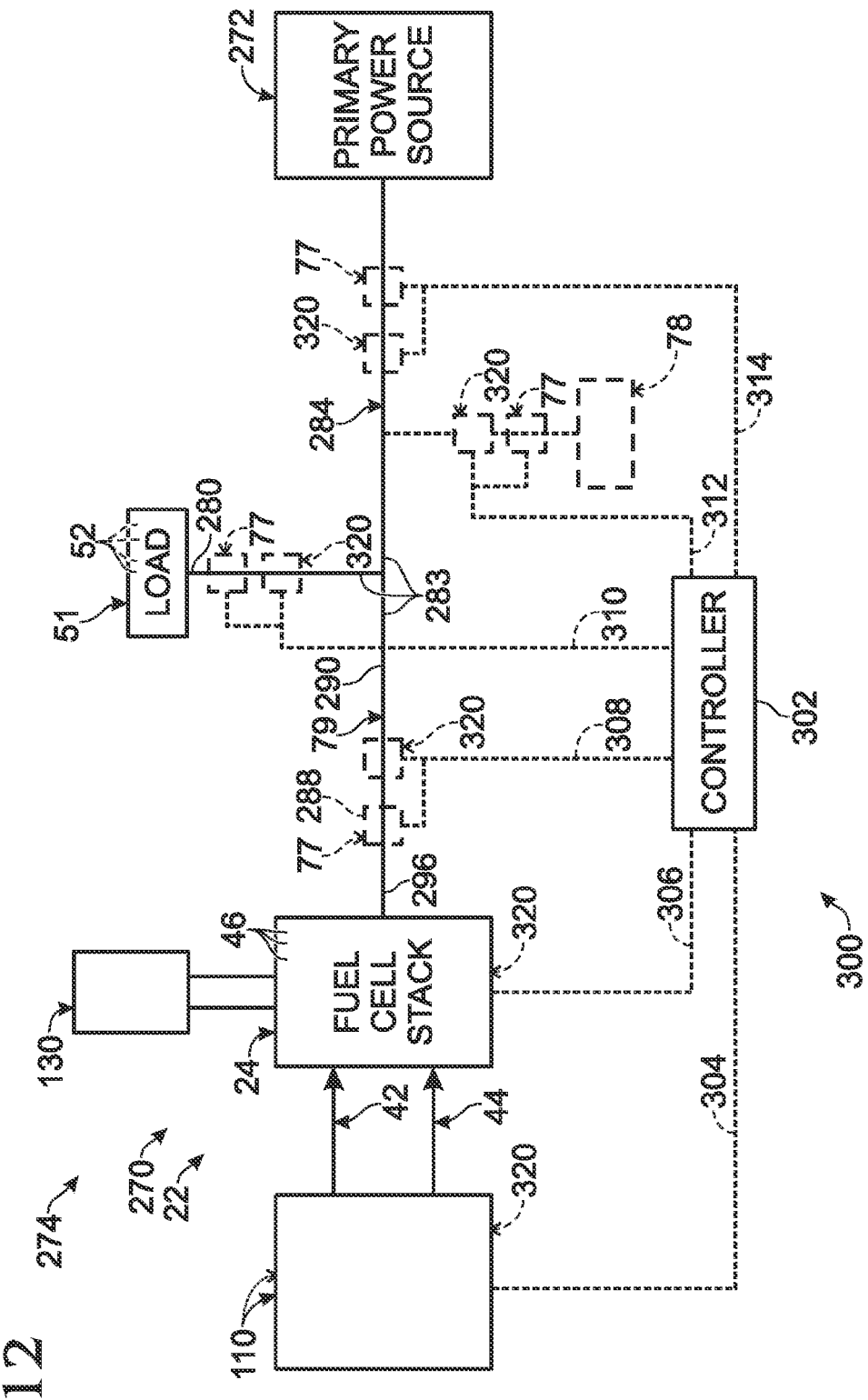
FIG. 12 is a schematic view of a fuel cell system that provides an auxiliary power source for an energy-consuming assembly that is also nominally powered by a primary power source.

Fuel cell systems 22 with a thermal management system according to the present disclosure may be designed to be either the primary or the backup power source for an energy-consuming assembly that includes one or more energy-consuming devices. When implemented as a backup, or auxiliary, power source for an energy-consuming assembly, a fuel cell system 22 with a thermal management system 130 according to the present disclosure may be utilized during times when a primary power source is unable or unavailable to satisfy some or all of the energy demand, or applied load, of the energy-consuming assembly. FIG. 12 schematically depicts an example of a fuel cell system 22 with a thermal management system 130 that is implemented as an auxiliary power source 270 for an energy-consuming assembly 51. When so implemented, the auxiliary power source may additionally or alternatively be referred to as an auxiliary fuel cell system and/or as a backup power source. Also shown in FIG. 12 at 272 is a primary power source, which is also in electrical communication with the energy-consuming assembly and adapted to provide an electrical output thereto to satisfy at least a portion of the applied load from the energy-consuming assembly. The primary power source and the auxiliary fuel cell system may collectively be referred to as a power delivery network 274, which may also include at least one energy-storage device 78 associated with at least one of the auxiliary fuel cell system and the primary power source.

As illustrated in FIG. 12, energy-consuming assembly 51 is adapted to be powered by power-delivery network 274, for example, by primary power source 272, auxiliary power source 270, and/or energy-storage device 78, which may be referred to as a stored-energy power source. Expressed in slightly different terms, energy-consuming assembly 51 includes at least one energy-consuming device 52 that is in electrical communication with the power-delivery network, such as via a load circuit 280. The energy-consuming assembly may be powered by only one power source at a time or may be powered, in part, by two or more power sources at the same time. When powered by two or more power sources at the same time, the collective power output may be delivered to the energy-consuming assembly, optionally with distinct subsets of energy-consuming devices 52 being powered by distinct power sources.

The energy-consuming assembly may be disposed in electrical communication with the primary and auxiliary power sources via any suitable power conduit(s), such as schematically represented at 283 in FIG. 12. The primary power source and auxiliary power source may be described as having electrical buses in communication with each other and the energy-consuming assembly.

Energy-consuming assembly 51 may be adapted to be primarily, or principally, powered by primary power source 272. Primary power source 272 may be any suitable source of a suitable power output 284 for satisfying the applied load from the energy-consuming assembly. For example, primary power source 272 may include, correspond to, or be part of an electrical utility grid, another fuel cell system, a solar power system, a wind power system, a nuclear power system, a turbine-based power system, a hydroelectric power system, etc.

The energy-consuming assembly is adapted to apply a load to power-delivery network 274. The load typically includes at least one electrical load, although it may include a thermal load. The primary power source is (nominally) adapted to satisfy that load (i.e., by providing a sufficient power output to the energy-consuming assembly), and the auxiliary power source is (nominally) adapted to provide a power output to at least partially, if not completely, satisfy the applied load when the primary power source is unable or otherwise unavailable to do so (when the fuel cell system is providing backup power) or is available (when the fuel cell system is performing maintenance). As discussed, these power outputs may additionally or alternatively be referred to herein as electrical outputs. The power and/or electrical outputs may be described as having a current and a voltage.

Although not required, it is within the scope of the present disclosure that the auxiliary power source is adapted to immediately satisfy this applied load upon the primary power source being unable to do so. In other words, it is within the scope of the present disclosure that the auxiliary power source is adapted to provide energy-consuming assembly 51 with an uninterruptible power supply, or an uninterrupted supply of power. By this it is meant that the auxiliary power source may be configured to provide a power output that satisfies the applied load from energy-consuming assembly 51 in situations where the primary power source is not able or available to satisfy this load, with the auxiliary power source being adapted to provide this power output sufficiently fast that the power supply to the energy-consuming assembly is not, or not noticeably, interrupted. By this it is meant that the power output may be provided sufficiently fast that the operation of the energy-consuming assembly is not stopped or otherwise negatively impacted.

Energy-storage device 78, when included, may be adapted to store at least a portion of the electrical output, or power output, 79 from fuel cell stack 24 of fuel cell system 22 or the power from the primary power source, such at to charge the batteries and/or equalize charges among and/or between batteries.

Power-delivery network 274 may, but is not required to, include at least one power-management module 77. As discussed, power-management module 77 includes any suitable structure or device(s) for conditioning or otherwise regulating the electrical output produced by primary power source 272, auxiliary power source 270, and/or energy-storage device(s) 78, and/or being delivered to/from energy-consuming devices 52 of energy-consuming assembly 51. In some embodiments, the power delivery network may include at least one power-management module 77 operatively coupled to an output circuit 286 of the fuel cell system and including a voltage adjustment mechanism 288 for changing the output voltage 290 at which the fuel cell system is supplying (or attempting to supply) power to energy-consuming assembly 51 and/or energy-storage device 78.

Fuel cell systems 22 and/or power delivery networks 274 according to the present disclosure may, but are not required to, also include a control system 300. Control system 300 may include at least one controller 302 (e.g., a microprocessor and/or a computing device, among others) that selectively regulates the operation of the fuel cell system 22 and/or power delivery network 274, such as by monitoring and/or controlling the operation of various components and/or monitoring and/or controlling various operating parameters of fuel cell system 22 and/or power delivery network 274. The controller, when present, may have any suitable configuration, and may include software, firmware, and/or hardware components.

The control system may include any suitable number and type of communication links for receiving input signals and for sending output signals (e.g., command signals). For the purpose of schematic illustration, controller 302 is shown in FIG. 12 in communication, via respective communication links 304-316, with reactant delivery system 110 (such as to deliver stream of hydrogen gas 42 and air or oxygen gas 44), fuel cell stack 24, and each of the power-management modules 77 and a variety of sensors 320. However, each of these communication links is optional and thus network 274 and/or fuel cell system 22 may be configured to have any suitable subset of the communication links depicted here. Furthermore, alternatively or in addition, the controller may be in communication with and/or operatively coupled to any other suitable portion of power delivery network 274. The control system may include or be in communication with any suitable number and type of sensors 320 for measuring various system or ambient parameters or characteristics (such as temperature, pressure, flow rate, current, voltage, capacity, composition, etc.) and communicating these values to the controller.

Communication between control system 300 and any portion of fuel cell system 22 and/or power delivery network 274 may be mostly or exclusively one-way communication or may include at least two-way communication. In some embodiments, the control system 300 may include a plurality of controllers 302 in communication with each other. For example, one of the controllers may be a primary, or central, controller that coordinates and controls the activity of one or more (or all) other controllers. Coupling and/or communication between the controllers and/or between a controller and each other fuel cell system 22 and/or network 274 component may be wired or wireless for each coupling and thus may be electrical (e.g., conductive), electromagnetic (e.g., inductive and/or capacitive coupling), optical, and/or the like.

The control system may automate and/or control any suitable aspects of fuel cell system operation, including operation of thermal management system 130. Control system 300 may similarly be utilized in fuel cell systems 22 according to the present disclosure that are themselves configured to be a primary power source for an energy-consuming assembly and/or which are not configured to backup, or supplement, a primary power source.

Figure 13:
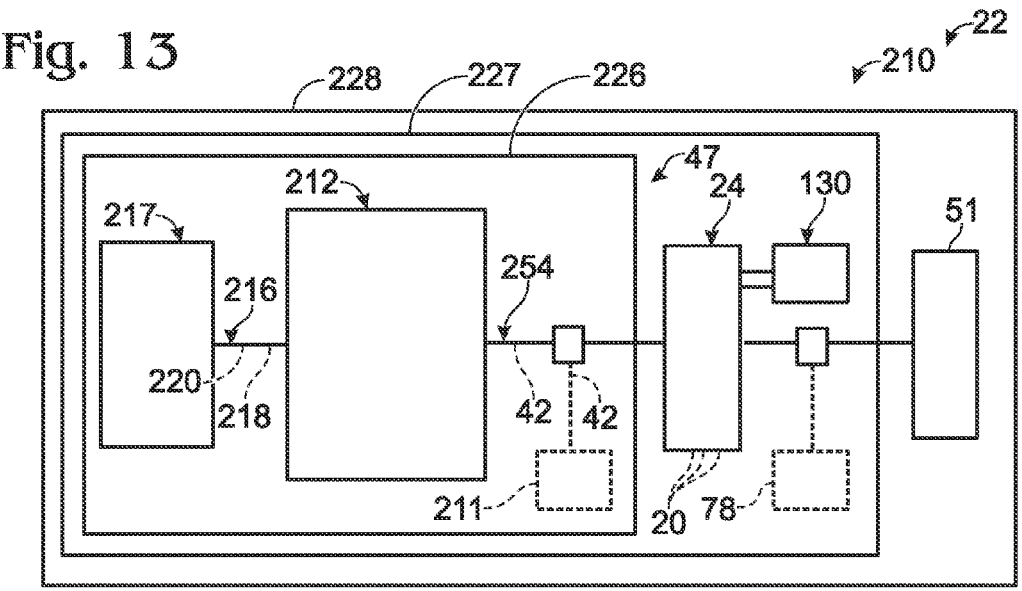
FIG. 13 is a schematic view of another illustrative fuel cell system that includes a thermal management system according to the present disclosure.

As discussed above, fuel cell stacks 24 with thermal management systems 130 according to the present disclosure may be coupled with a source 47 of hydrogen gas 42 (and related delivery systems and balance of plant components) to form a fuel cell system. A schematic example of such a fuel cell system 22 according to the present disclosure is shown in FIG. 13 and generally indicated at 210. As discussed previously with respect to FIG. 1, examples of sources 47 of hydrogen gas 42 include a storage device 211 that contains a stored supply of hydrogen gas, as indicated in dashed lines in FIG. 13. Examples of suitable storage devices 211 include pressurized tanks and hydride beds.

An additional or alternative source 47 of hydrogen gas 42 is the product stream from a fuel processor, which produces hydrogen gas by reacting a feed stream containing at least one feedstock to produce reaction products from which the stream containing hydrogen gas 42 is formed. As shown in solid lines in FIG. 13, system 210 includes at least one fuel processor 212 and at least one fuel cell stack 24. Fuel processor 212 (and any associated feedstock delivery system, heating/cooling assembly, and the like) may be referred to as a hydrogen-generation assembly that includes at least one hydrogen-generating region. Fuel processor 212 is adapted to produce a product hydrogen stream 254 containing hydrogen gas 42 from a feed stream 216 containing at least one feedstock. One or more fuel cell stacks 24 are adapted to produce an electrical output from the portion of product hydrogen stream 254 delivered thereto. In the illustrated embodiment, a single fuel processor 212 and a single fuel cell stack 24 are shown; however, it is within the scope of the disclosure that more than one of either or both of these components may be used. It should be understood that these components have been schematically illustrated and that the fuel cell system may include additional components that are not specifically illustrated in the Figures, such as air delivery systems, heat exchangers, heating assemblies, fluid conduits, and the like. As also shown, hydrogen gas may be delivered to stack 24 from one or more of fuel processor 212 and storage device 211, and hydrogen gas from the fuel processor may be delivered to one or more of the storage device 211 and fuel cell stack 24. Some or all of stream 254 may additionally, or alternatively, be delivered, via a suitable conduit, for use in another hydrogen-consuming process, burned for fuel or heat, or stored for later use.

Fuel processor 212 is any suitable device that produces hydrogen gas from the feed stream. Examples of suitable mechanisms for producing hydrogen gas from feed stream 216 include steam reforming and autothermal reforming, in which reforming catalysts are used to produce hydrogen gas from a feed stream containing a carbon-containing feedstock and water. Other suitable mechanisms for producing hydrogen gas include pyrolysis and catalytic partial oxidation of a carbon-containing feedstock, in which case the feed stream does not contain water. Still another suitable mechanism for producing hydrogen gas is electrolysis, in which case the feedstock is water. Examples of suitable carbon-containing feedstocks include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol. It is within the scope of the present disclosure that the fuel processor may be adapted to produce hydrogen gas by utilizing more than a single mechanism.

Figure 14:
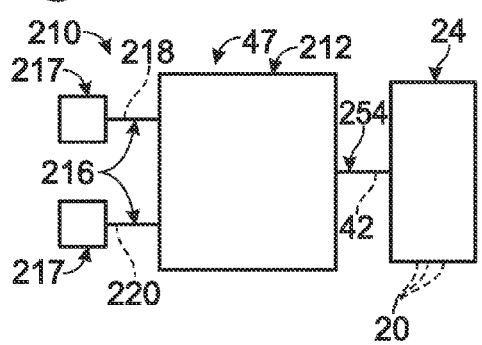
FIG. 14 is a schematic view of an illustrative hydrogen generation assembly that may be used with fuel cell systems that include a thermal management system according to the present disclosure.

Feed stream 216 may be delivered to fuel processor 212 via any suitable mechanism. Although only a single feed stream 216 is shown in FIG. 13, more than one stream 216 may be used and these streams may contain the same or different feedstocks. When carbon-containing feedstock 218 is miscible with water, the feedstock is typically, but not required to be, delivered with the water component of feed stream 216, such as shown in FIG. 13. When the carbon-containing feedstock is immiscible or only slightly miscible with water, these feedstocks are typically delivered to fuel processor 212 in separate streams, such as shown in FIG. 14. In FIGS. 13 and 14, feed stream 216 is shown being delivered to fuel processor 212 by a feedstock delivery system 217.

In many applications, it is desirable for the fuel processor to produce at least substantially pure hydrogen gas. Accordingly, the fuel processor may include one or more hydrogen producing regions that utilize a process that inherently produces sufficiently pure hydrogen gas, or the fuel processor may include suitable purification and/or separation devices that remove impurities from the hydrogen gas produced in the fuel processor. As another example, the fuel processing system or fuel cell system may include purification and/or separation devices downstream from the fuel processor. In the context of a fuel cell system, the fuel processor preferably is adapted to produce substantially pure hydrogen gas, and even more preferably, the fuel processor is adapted to produce pure hydrogen gas. For the purposes of the present disclosure, substantially pure hydrogen gas is greater than 90 pure, greater than 95% pure, greater than 99% pure, or greater than 99.5% pure. Illustrative, non-exclusive examples of suitable fuel processors are disclosed in U.S. Pat. Nos. 6,221,117, 5,997,594, 5,861,137, and pending U.S. Patent Application Publication Nos. 2001/0045061, 2003/0192251, and 2003/0223926. The complete disclosures of the above-identified patents and patent applications are hereby incorporated by reference.

Figure 15:
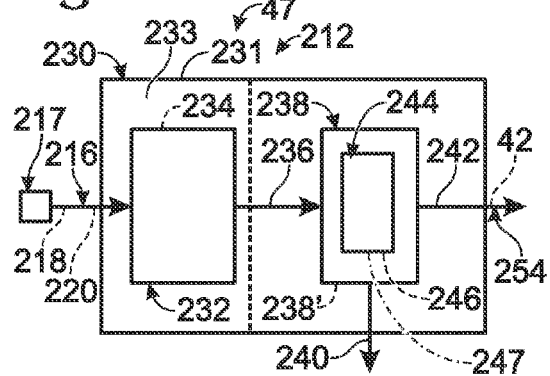
FIG. 15 is a schematic view of another illustrative hydrogen generation assembly that may be used with fuel cell systems that include a thermal management system according to the present disclosure.

For purposes of illustration, the following discussion will describe fuel processor 212 as a steam reformer that is adapted to receive a feed stream 216 containing a carbon-containing feedstock 218 and water 220. However, it is within the scope of the disclosure that fuel processor 212 may take other forms, as discussed above. An example of a suitable steam reformer is shown in FIG. 15 and indicated generally at 230. Reformer 230 includes a reforming, or hydrogen-producing, region 232 that includes a steam reforming catalyst 234. Alternatively, reformer 230 may be an autothermal reformer. In reforming region 232, a reformate stream 236 is produced from the water and carbon-containing feedstock in feed stream 216. The reformate stream typically contains hydrogen gas and other gases. In the context of a fuel processor generally, a mixed gas stream that contains hydrogen gas as its majority component is produced from the feed stream. The mixed gas stream typically includes other gases as well. Illustrative, non-exclusive examples of these other gases, or impurities, include one or more of such illustrative impurities as carbon monoxide, carbon dioxide, water, methane, and unreacted feedstock. The mixed gas, or reformate, stream is delivered to a separation region, or purification region, 238, where the hydrogen gas is purified. In separation region 238, the hydrogen-containing stream is separated into one or more byproduct streams, which are collectively illustrated at 240 and which typically include at least a substantial portion of the other gases, and a hydrogen-rich stream 242, which contains at least substantially pure hydrogen gas. The separation region may utilize any suitable separation process, including a pressure-driven separation process. In FIG. 15, hydrogen-rich stream 242 is shown forming product hydrogen stream 254.

An example of a suitable structure for use in separation region 238 is a membrane module 244, which contains one or more hydrogen permeable membranes 246. Illustrative, non-exclusive examples of suitable membrane modules formed from a plurality of hydrogen-selective metal membranes are disclosed in U.S. Pat. No. 6,319,306, the complete disclosure of which is hereby incorporated by reference. In the '306 patent, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels. Also disclosed in the above-identified application are tubular hydrogen-selective membranes, which also may be used. Other suitable membranes and membrane modules are disclosed in the above-incorporated patents and applications, as well as U.S. Pat. Nos. 6,562,111 and 6,537,352, the complete disclosures of which are hereby incorporated by reference. Membrane(s) 246 may also be integrated directly into the hydrogen-producing region or other portion of fuel processor 212.

The thin, planar, hydrogen-permeable membranes are preferably composed of palladium alloys, most especially palladium with 35 wt % to 45 wt % copper, such as approximately 40 wt % copper. These membranes, which also may be referred to as hydrogen-selective membranes, are typically formed from a thin foil that is approximately 0.001 inches thick. It is within the scope of the present disclosure, however, that the membranes may be formed from hydrogen-selective metals and metal alloys other than those discussed above, hydrogen-permeable and hydrogen-selective ceramics, or carbon compositions. The membranes may have thicknesses that are larger or smaller than discussed above. For example, the membrane may be made thinner, with commensurate increase in hydrogen flux. The hydrogen-permeable membranes may be arranged in any suitable configuration, such as arranged in pairs around a common permeate channel as is disclosed in the incorporated patents. The hydrogen permeable membrane or membranes may take other configurations as well, such as tubular configurations, which are disclosed in the incorporated patents.

Figure 16:
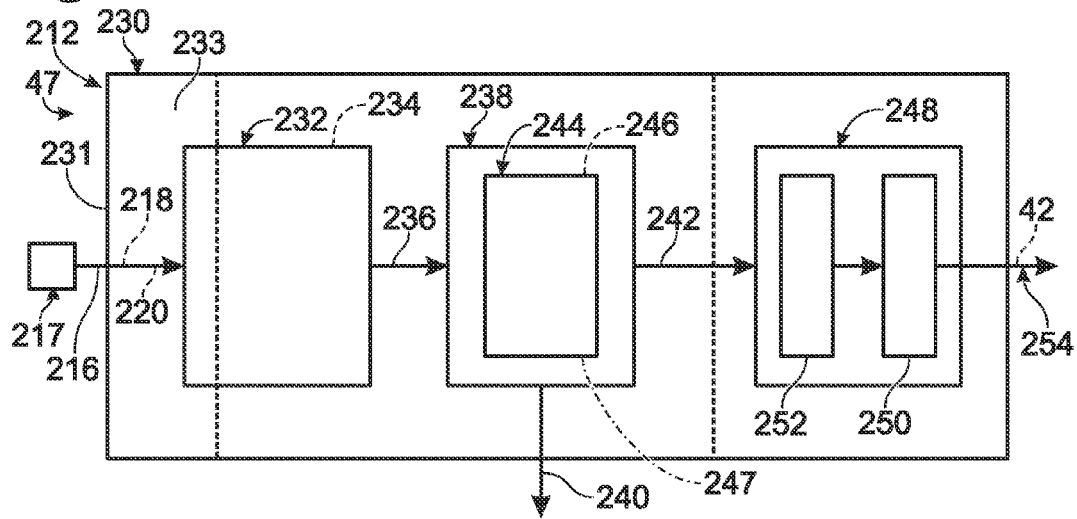
FIG. 16 is a schematic view of another illustrative hydrogen generation assembly that may be used with fuel cell systems that include a thermal management system according to the present disclosure.

Another example of a suitable pressure-separation process for use in separation region 238 is pressure swing adsorption (PSA), with a pressure swing adsorption assembly being indicated in dash-lot lines at 247 in FIGS. 15 and 16. In a pressure swing adsorption (PSA) process, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from reformate stream 236. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases such as $NH_3$, $H_2S$, and $H_2O$ adsorb very strongly on the adsorbent material and are therefore removed from stream 236 along with other impurities. If the adsorbent material is going to be regenerated and these impurities are present in stream 236, separation region 238 preferably includes a suitable device that is adapted to remove these impurities prior to delivery of stream 236 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. It should be understood, however, that other suitable adsorbent material compositions, forms and configurations may be used.

As discussed, it is also within the scope of the disclosure that at least some of the purification of the hydrogen gas is performed intermediate the fuel processor and the fuel cell stack. Such a construction is schematically illustrated in dashed lines in FIG. 15, in which the separation region 238' is depicted downstream from the shell 231 of the fuel processor.

Reformer 230 may, but does not necessarily, additionally or alternatively, include a polishing region 248, such as shown in FIG. 16. As shown, polishing region 248 receives hydrogen-rich stream 242 from separation region 238 and further purifies the stream by reducing the concentration of, or removing, selected compositions therein. For example, when stream 242 is intended for use in a fuel cell stack, compositions that may damage the fuel cell stack, such as carbon monoxide and carbon dioxide, may be removed from the hydrogen-rich stream. For some fuel cells, such as some PEM fuel cells, the concentration of carbon monoxide should be less than 10 ppm (parts per million), with further illustrative, non-exclusive examples including less than 5 ppm, and less than 1 ppm. The concentration of carbon dioxide may be greater than that of carbon monoxide, and for some fuel cells concentrations of less than 25% carbon dioxide may be acceptable, with further illustrative, non-exclusive examples including less than 10% less than 1%, and less than 50 ppm. It should be understood that the acceptable maximum concentrations presented herein are illustrative examples, and that concentrations other than those presented herein may be used and are within the scope of the present disclosure. For example, particular users or manufacturers may require minimum or maximum concentration levels or ranges that are different than those identified herein. Similarly, when fuel processor 212 is not used with a fuel cell stack, or when it is used with a fuel cell stack that is more tolerant of these impurities, then the product hydrogen stream may contain larger amounts of these gases.

Polishing region 248, when present, may include any suitable structure for removing or reducing the concentration of the selected compositions in stream 242. For example, when the product stream is intended for use in a PEM fuel cell stack or other device that will be damaged if the stream contains more than determined concentrations of carbon monoxide or carbon dioxide, it may be desirable to include at least one methanation catalyst bed 250. Bed 250 converts carbon monoxide and carbon dioxide into methane and water, both of which will not damage a PEM fuel cell stack. Polishing region 248 may (but is not required to) also include another hydrogen-producing device 252, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

Steam reformers typically operate at temperatures in the range of 200° C. and 900° C., and at pressures in the range of 50 psi and 1000 psi, although temperatures and pressures outside of these ranges are within the scope of the disclosure, such as depending upon the particular type and configuration of fuel processor being used. Any suitable heating mechanism or device may be used to provide this heat, such as a heater, burner, combustion catalyst, or the like. The heating assembly may be external the fuel processor or may form a combustion chamber that forms part of the fuel processor. The fuel for the heating assembly may be provided by the fuel processing system, by the fuel cell system, by an external source, or any combination thereof.

In FIGS. 15 and 16, reformer 230 is shown including a shell 231 in which the above-described components are contained. Shell 231, which also may be referred to as a housing, enables the fuel processor, such as reformer 230, to be moved as a unit. It also protects the components of the fuel processor from damage by providing a protective enclosure and reduces the heating demand of the fuel processor because the components of the fuel processor may be heated as a unit. Shell 231 may, but does not necessarily, include insulating material 233, such as a solid insulating material, blanket insulating material, or an air-filled cavity. It is within the scope of the disclosure, however, that the reformer may be formed without a housing or shell. When reformer 230 includes insulating material 233, the insulating material may be internal the shell, external the shell, or both. When the insulating material is external a shell containing the above-described reforming, separation and/or polishing regions, the fuel processor may further include an outer cover or jacket external the insulation.

It is further within the scope of the disclosure that one or more of the components may either extend beyond the shell or be located external at least shell 231. For example, and as schematically illustrated in FIG. 16, polishing region 248 may be external shell 231 and/or a portion of reforming region 232 may extend beyond the shell. Other examples of fuel processors demonstrating these configurations are illustrated in the incorporated references and discussed in more detail herein.

Although fuel processor 212, feedstock delivery system 217, fuel cell stack 24 and energy-consuming assembly 51 may all be formed from one or more discrete components, it is also within the scope of the disclosure that two or more of these devices may be integrated, combined or otherwise assembled within an external housing or body. For example, a fuel processor and feedstock delivery system may be combined to provide a hydrogen-producing device with an onboard, or integrated, feedstock delivery system, such as schematically illustrated at 226 in FIG. 13. Similarly, a fuel cell stack may be added to provide an energy-generating device with an integrated feedstock delivery system, such as schematically illustrated at 227 in FIG. 13.

Fuel cell system 210 may (but is not required to) additionally be combined with one or more energy-consuming devices 52 to provide the device with an integrated, or on-board, energy source. For example, the body of such a device is schematically illustrated in FIG. 13 at 228.

INDUSTRIAL APPLICABILITY

The fuel cell stacks, systems, and thermal management systems disclosed herein are applicable to the energy-production industries, and more particularly to the fuel cell industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A fuel cell system, comprising:
a fuel cell stack configured to produce an electrical output from a fuel and an oxidant;
a thermal management system configured to selectively deliver a heat exchange fluid stream containing a liquid heat exchange fluid to the fuel cell stack, wherein the thermal management system comprises:
a liquid reservoir;
a volume of liquid heat exchange fluid within the liquid reservoir;
a heat exchange circuit fluidly interconnecting the fuel cell stack and the liquid reservoir and including a plurality of fluid conduits, wherein the plurality of fluid conduits includes a delivery conduit through which liquid heat exchange fluid may flow from the liquid reservoir to the fuel cell stack, at least one fuel cell heat exchange conduit through which liquid heat exchange fluid may flow in thermal communication with the fuel cell stack, and a return conduit through which a recycle stream of the liquid heat exchange fluid may flow from the fuel cell stack to the liquid reservoir;

a delivery mechanism configured to selectively propel the liquid heat exchange fluid within the heat exchange circuit; and wherein the thermal management system includes a drainage assembly that is configured to automatically withdraw liquid heat exchange fluid from the heat exchange circuit when the thermal management system is not being used to deliver the heat exchange fluid stream to the fuel cell stack, wherein the liquid reservoir is positioned relative to the fuel cell stack so that liquid heat exchange fluid automatically drains from the fuel cell stack to the liquid reservoir when the delivery mechanism is not being used to propel the liquid heat exchange fluid from the liquid reservoir to the fuel cell stack.

2. The fuel cell system of claim 1, wherein the liquid reservoir is positioned at a lower elevation than the fuel cell stack.

3. The fuel cell system of claim 1, wherein the thermal management system includes a draining pump that is configured to propel the liquid heat exchange fluid from the fuel cell stack to the liquid reservoir when the delivery mechanism is not propelling the liquid heat exchange fluid from the liquid reservoir to the fuel cell stack.

4. The fuel cell system of claim 1, wherein the thermal management system includes an air delivery system that is configured to propel the liquid heat exchange fluid from the fuel cell stack to the liquid reservoir when the delivery mechanism is not being used to propel the liquid heat exchange fluid from the liquid reservoir to the fuel cell stack.

5. The fuel cell system of claim 1, wherein the drainage assembly is configured to remove at least 50% of the liquid heat exchange fluid in the heat exchange circuit.

6. The fuel cell system of claim 1, wherein the drainage assembly is configured to remove at least 75% of the liquid heat exchange fluid in the heat exchange circuit.

7. The fuel cell system of claim 1, wherein the thermal management system is configured to return the liquid heat exchange fluid that is withdrawn from the heat exchange circuit to the liquid reservoir.

8. The fuel cell system of claim 1, wherein the heat exchange circuit is sized to hold a maximum volume of the liquid heat exchange fluid, and further wherein the liquid reservoir is configured to hold at least 50% more liquid heat exchange fluid than the maximum volume.

9. The fuel cell system of claim 1, wherein the liquid heat exchange fluid is selected from the group consisting of water, deionized water, and a water-based liquid.

10. The fuel cell system of claim 9, wherein the liquid heat exchange fluid is deionized water.

11. The fuel cell system of claim 1, wherein the fuel cell stack is a proton exchange membrane fuel cell stack, wherein the fuel is hydrogen gas, and wherein the oxidant is air.

12. The fuel cell system of claim 1, wherein the fuel cell system includes a heating assembly that is configured to maintain at least one of the liquid reservoir and the fuel cell stack above a minimum temperature.

13. The fuel cell system of claim 12, wherein the minimum temperature is at least 25° C. above the freezing point of the liquid heat exchange fluid.

14. The fuel cell system of claim 1, wherein the delivery mechanism includes at least one pump that is configured to selectively propel the liquid heat exchange fluid within the heat exchange circuit.

15. The fuel cell system of claim 1, wherein the drainage assembly further includes a draining pump that is configured to propel the liquid heat exchange fluid from the fuel cell stack to the liquid reservoir when the delivery mechanism is not propelling the liquid heat exchange fluid from the liquid reservoir to the fuel cell stack.

16. A method of operating the fuel cell system of claim 1, the method comprising:

delivering, to the fuel cell stack via the heat exchange circuit, the liquid heat exchange fluid from the liquid reservoir;

distributing the liquid heat exchange fluid into thermal communication with a plurality of fuel cells of the fuel cell stack;

withdrawing, from the fuel cell stack to the heat exchange circuit, the liquid heat exchange fluid;

returning at least a portion of the liquid heat exchange fluid to the liquid reservoir;

ceasing the delivering, distributing, withdrawing, and returning;

after the ceasing, automatically draining liquid heat exchange fluid from the heat exchange circuit.

17. The method of claim 16, wherein the automatically draining is performed during periods in which the thermal management system is not being used to deliver the heat exchange fluid stream to the fuel cell stack.

18. The method of claim 16, wherein the automatically draining includes automatically draining at least 50% of the liquid heat exchange fluid in the heat exchange circuit.

19. The method of claim 16, wherein the method further includes returning the liquid heat exchange fluid drained from the heat exchange circuit to the liquid reservoir.

20. The method of claim 16, wherein the withdrawing liquid heat exchange fluid from the fuel cell stack to the heat exchange circuit forms a recycle stream, and further wherein the withdrawing includes delivering the recycle stream to a heat exchange assembly for heat exchange with a heat exchange stream to heat or cool the recycle stream.

21. The method of claim 20, wherein the method further includes selectively delivering the recycle stream to at least one of the liquid reservoir and the fuel cell stack.

22. The method of claim 16, wherein the liquid heat exchange fluid has a freezing point that is greater than a subfreezing temperature of the fuel cell stack.

* * * * *